United States Patent
Kim et al.

(10) Patent No.: US 7,538,850 B2
(45) Date of Patent: May 26, 2009

(54) PANEL FOR DISPLAY DEVICE, MANUFACTURING METHOD THEREOF AND LIQUID CRYSTAL DISPLAY

(75) Inventors: Dong-Gyu Kim, Yongin (KR); Shi-Yul Kim, Suwon (KR); Sang-Soo Kim, Seoul (KR)

(73) Assignee: Samsung Electronics., Co., Ltd., Suwon-ssi, Gyeonggi-do (KR)

( * ) Notice: Subject to any disclaimer, the term of this patent is extended or adjusted under 35 U.S.C. 154(b) by 18 days.

(21) Appl. No.: 10/752,968

(22) Filed: Jan. 7, 2004

(65) Prior Publication Data

US 2004/0183989 A1 Sep. 23, 2004

(30) Foreign Application Priority Data

Mar. 17, 2003 (KR) ............... 10-2003-0016550

(51) Int. Cl.
G02F 1/1339 (2006.01)
(52) U.S. Cl. ............... 349/155; 349/156; 349/157; 349/106; 349/110; 349/129; 349/130
(58) Field of Classification Search ............ 349/38–43, 349/106, 155–157, 110, 129, 130; 438/30
See application file for complete search history.

(56) References Cited

U.S. PATENT DOCUMENTS

| | | | | |
|---|---|---|---|---|
| 5,838,414 A * | 11/1998 | Lee | ............... | 349/157 |
| 6,067,144 A * | 5/2000 | Murouchi | ............... | 349/156 |
| 6,118,505 A | 9/2000 | Nagata et al. | | |
| 6,191,835 B1 | 2/2001 | Choi | | |
| 6,671,025 B1 * | 12/2003 | Ikeda et al. | ............... | 349/156 |
| 6,774,975 B2 * | 8/2004 | Ahn | ............... | 349/156 |
| 6,795,141 B2 * | 9/2004 | Yamada | ............... | 349/106 |
| 6,850,309 B2 * | 2/2005 | Inoue et al. | ............... | 349/157 |
| 7,057,695 B2 * | 6/2006 | Mun et al. | ............... | 349/141 |
| 7,247,411 B2 * | 7/2007 | Song | ............... | 430/7 |

(Continued)

FOREIGN PATENT DOCUMENTS

CN 1290922 4/2001

(Continued)

OTHER PUBLICATIONS

English Abstract for Publication No. 2000-298280.

(Continued)

*Primary Examiner*—David Nelms
*Assistant Examiner*—Thanh-Nhan P Nguyen
(74) *Attorney, Agent, or Firm*—F. Chau & Associates, LLC

(57) ABSTRACT

A method for forming a display device includes forming a first panel and a second panel. The step of forming a first panel includes forming a black matrix over portions of a first substrate, forming a common electrode over the black matrix, and forming a spacer over the common electrode and the black matrix. The step of forming the second panel includes forming a pixel electrode over a second substrate. The first panel and the second panel are disposed over one another such that the pixel electrode faces the common electrode and the black matrix with a liquid crystal layer therebetween. A vertical distance between the first panel and the second panel is determined by thicknesses of the spacer and the black matrix.

17 Claims, 37 Drawing Sheets

U.S. PATENT DOCUMENTS

| | | | |
|---|---|---|---|
| 2001/0005245 A1 | 6/2001 | Sakamoto et al. | |
| 2002/0034698 A1* | 3/2002 | Uno et al. | 430/7 |
| 2002/0050594 A1 | 5/2002 | Kim et al. | |
| 2002/0171781 A1* | 11/2002 | Kim | 349/43 |
| 2002/0197539 A1* | 12/2002 | Park et al. | 430/1 |
| 2003/0122984 A1* | 7/2003 | Song et al. | 349/43 |
| 2004/0252271 A1* | 12/2004 | Song | 349/155 |
| 2005/0041167 A1* | 2/2005 | Sugimoto et al. | 349/43 |
| 2005/0062898 A1* | 3/2005 | Imayama et al. | 349/43 |

FOREIGN PATENT DOCUMENTS

| | | |
|---|---|---|
| JP | 2000-298280 | 10/2000 |
| WO | WO 02/056103 | 7/2002 |

OTHER PUBLICATIONS

English Abstract for Publication No. CN1290922.
English Abstract for Publication No. WO 02/056103.

* cited by examiner

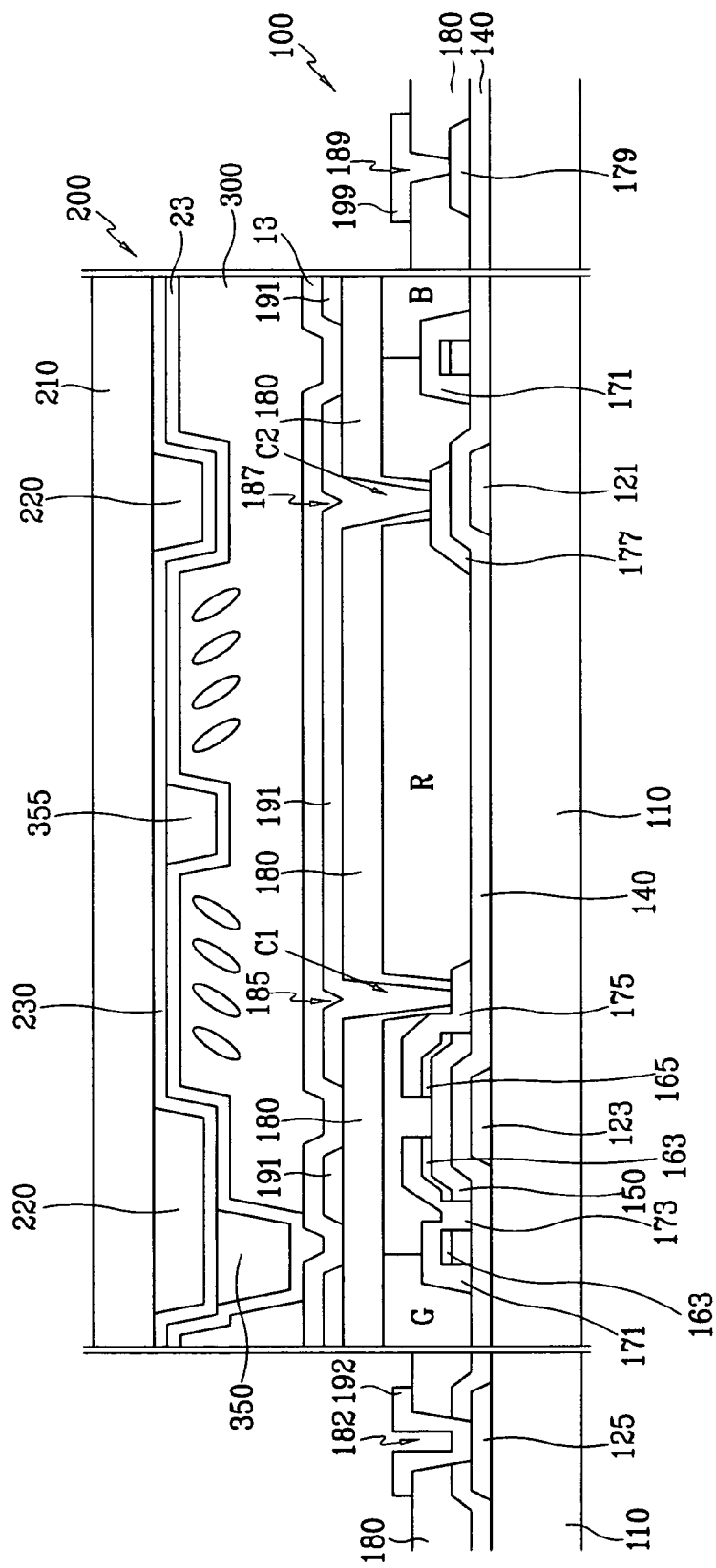

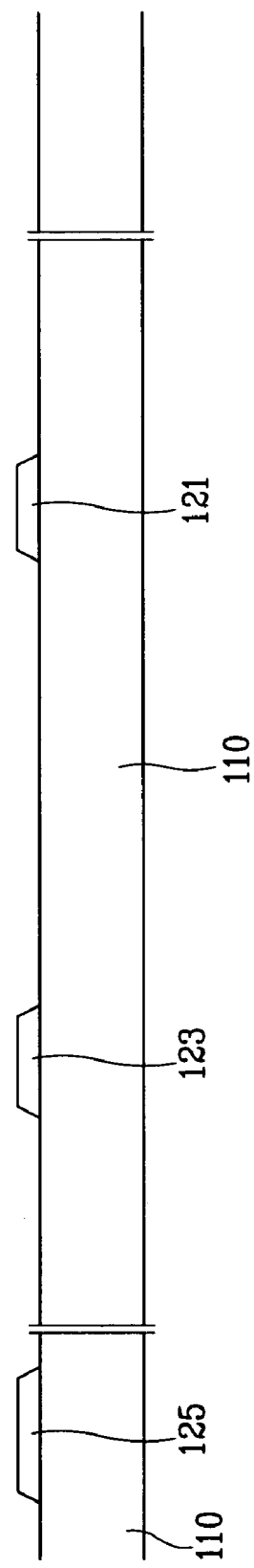

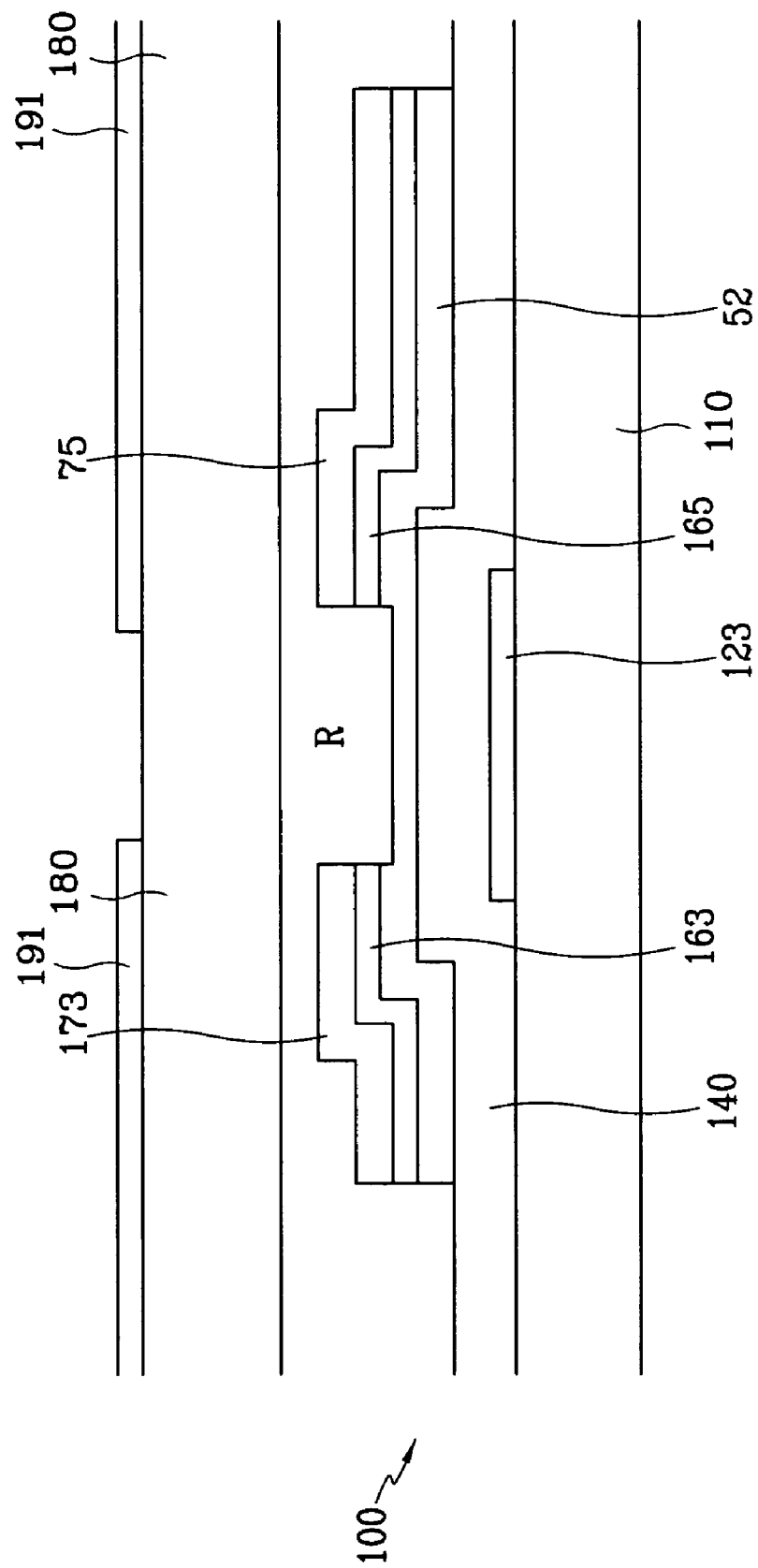

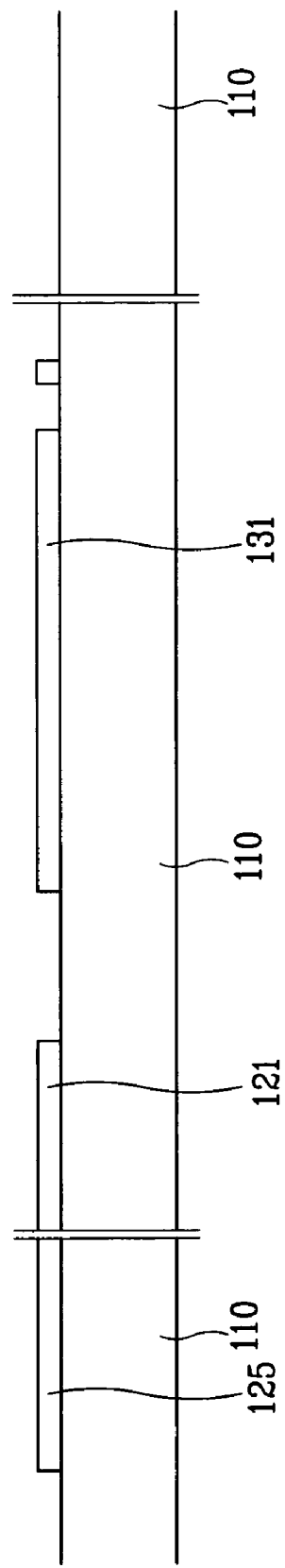

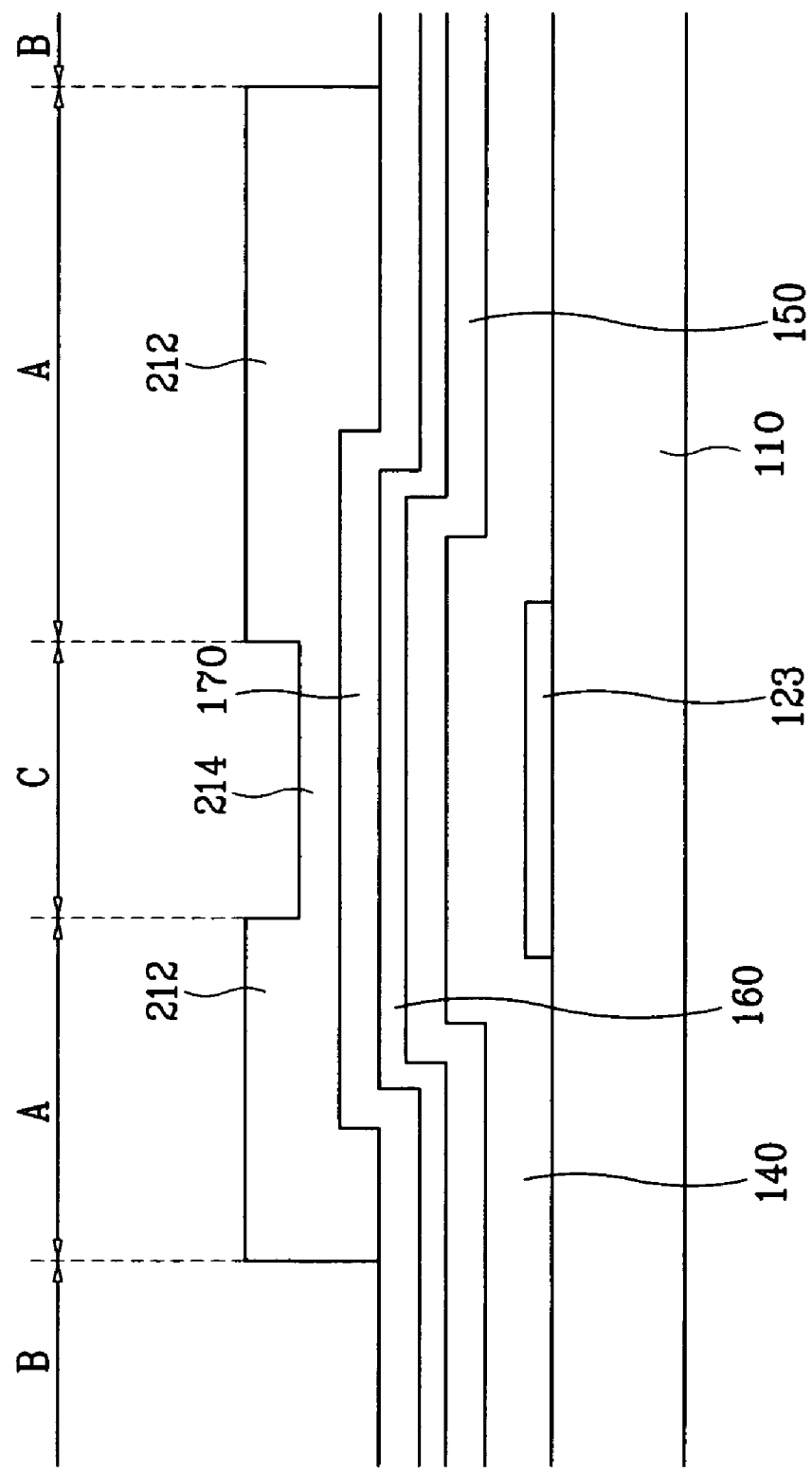

PANEL FOR DISPLAY DEVICE, MANUFACTURING METHOD THEREOF AND LIQUID CRYSTAL DISPLAY

BACKGROUND OF THE INVENTION (a) Technical Field

The present disclosure relates to a panel for a display device, a manufacturing method thereof, and a liquid crystal display.

(b) Description of the Related Art

Liquid crystal displays (LCDs) are one of the most widely used flat panel displays. A conventional LCD includes two panels with respective electrodes, a liquid crystal layer with dielectric anisotropy disposed between the two panels, and spacers that maintain a gap between the panels. The LCD displays desired images by applying an electric field to the liquid crystal layer to control the amount of light passing through the panels.

A conventional LCD has a plurality of electrodes formed on respective two panels and a plurality of thin film transistors (TFTs) for switching voltages applied to the electrodes. A plurality of signal lines, such as gate lines and data lines, a plurality of pixel electrodes and the TFTs, which control image signals transmitted to the pixel electrodes, are formed on one of the two panels. The other panel has a common electrode opposite to the pixel electrodes and a black matrix having a plurality of openings opposite the pixel electrodes.

A vertically aligned (VA) mode LCD utilizes a liquid crystal having dielectric anisotropy, and aligns the liquid crystal molecules vertical to surfaces of the panels. The VA mode LCD exhibits excellent contrast ratio because it can prevent light leakage in the absence of an electric field.

The respective panels are normally manufactured by a photo etching process using masks. The panel with the TFTs is generally manufactured using five or six masks, and the other panel with the color filters is manufactured by using three or four masks.

In the manufacture of LCDs, it is preferable to decrease the number of masks so as to reduce production cost and to simplify the manufacturing process.

SUMMARY OF THE INVENTION

An aspect of the present invention is to provide a simpler method for forming a display device, particulary a liquid crystal display device.

Another aspect of the present invention is to provide a method for forming a liquid crystal display device in which fewer number of masks are required to form display panels of the display device.

A method for forming a display device according to an exemplary embodiment of the invention includes formed a first panel and a second panel. The step of forming the first panel includes forming a black matrix over portions of a first substrate, forming a common electrode over the black matrix, and forming a spacer over the common electrode and the black matrix. The step of forming the second panel includes forming a pixel electrode over a second substrate. The first panel and the second panel are disposed over one another such that the pixel electrode faces the common electrode and black matrix with a liquid crystal layer therebetween. A vertical distance between the first panel and the second panel is determined by thicknesses of the spacer and the black matrix.

In at least one embodiment of the invention, the method for forming a display device includes forming a protrusion over the common electrode. The protrusion provides divisional alignment of liquid crystal molecules.

In at least one embodiment of the invention, the method for forming a display device includes forming the protrusion and the spacer simultaneously.

In at least one embodiment of the invention, the method for forming a display device includes forming a gate line over the second substrate, forming a gate insulating layer over the gate line, forming a semiconductor pattern over the gate insulating layer, forming an ohmic contact pattern over the semiconductor pattern, and forming a data line over the ohmic contact pattern, the data line intersecting the gate line and including a source electrode, a drain electrode and a storage-capacitor conductor. A color filter is formed over the data line. The color filter includes a first contact hole that exposes the drain electrode and a second contact hole that exposes the storage-capacitor conductor. A passivation layer is formed over the color filter. Contact holes are formed in the passivation layer that coincide with the first and second contact holes of the color filter.

In a method for forming a display device according to at least one embodiment of the invention, the semiconductor pattern, the ohmic contact pattern and the data line are formed simultaneously. The semiconductor pattern, the ohmic contact pattern and the data line are formed simultaneously in steps including forming a semiconductor layer over the gate insulation layer, forming a doped amorphous silicon layer over the semiconductor layer, and forming a conductive layer over the doped amorphous silicon layer. A portion of the conductive layer, a portion of the doped amorphous silicon layer and a portion of the semiconductor layer in a channel region are removed to separate the conductive layer into a data line and a drain electrode, to separate the doped amorphous silicon layer into an ohmic contact pattern and to form a semiconductor pattern.

A method for forming a display device according to another exemplary embodiment of the invention includes forming a first panel and a second panel. The step of forming the first panel includes forming a common electrode over a first substrate. The step of forming a second panel includes forming a gate line over a second substrate, forming a gate insulating layer over the gate line, forming a semiconductor pattern, an ohmic contact pattern and a data line simultaneously over the gate line, and forming a pixel electrode over the semiconductor pattern, the ohmic contact pattern and the data line. The first panel and the second panel are disposed over one another such that the pixel electrode faces the common electrode with a liquid crystal layer therebetween.

BRIEF DESCRIPTION OF THE DRAWINGS

The above and other objects and advantages of the present invention will become more apparent by describing preferred embodiments thereof in detail with reference to the accompanying drawings in which:

FIG. 2 is a sectional view of the LCD shown in FIG. 1 taken along the line II-II';

FIG. 4B is a sectional view of the TFT panel shown in FIG. 4A taken along the line IVB-IVB';

FIGS. 10 and 11 are sectional views of the TFT array panel taken along the lines XI-XI' and X-X' in FIG. 9, respectively;

FIGS. 12B and 12C are sectional views taken along the lines XIIB-XIIB' and XIIC-XIIC' in FIG. 12A;

FIGS. 14B and 14C are sectional views taken along the lines XIVB-XIVB' and XIVC-XIVC' in FIG. 14A, respectively;

DETAILED DESCRIPTION OF PREFERRED EMBODIMENTS

Figure 1:
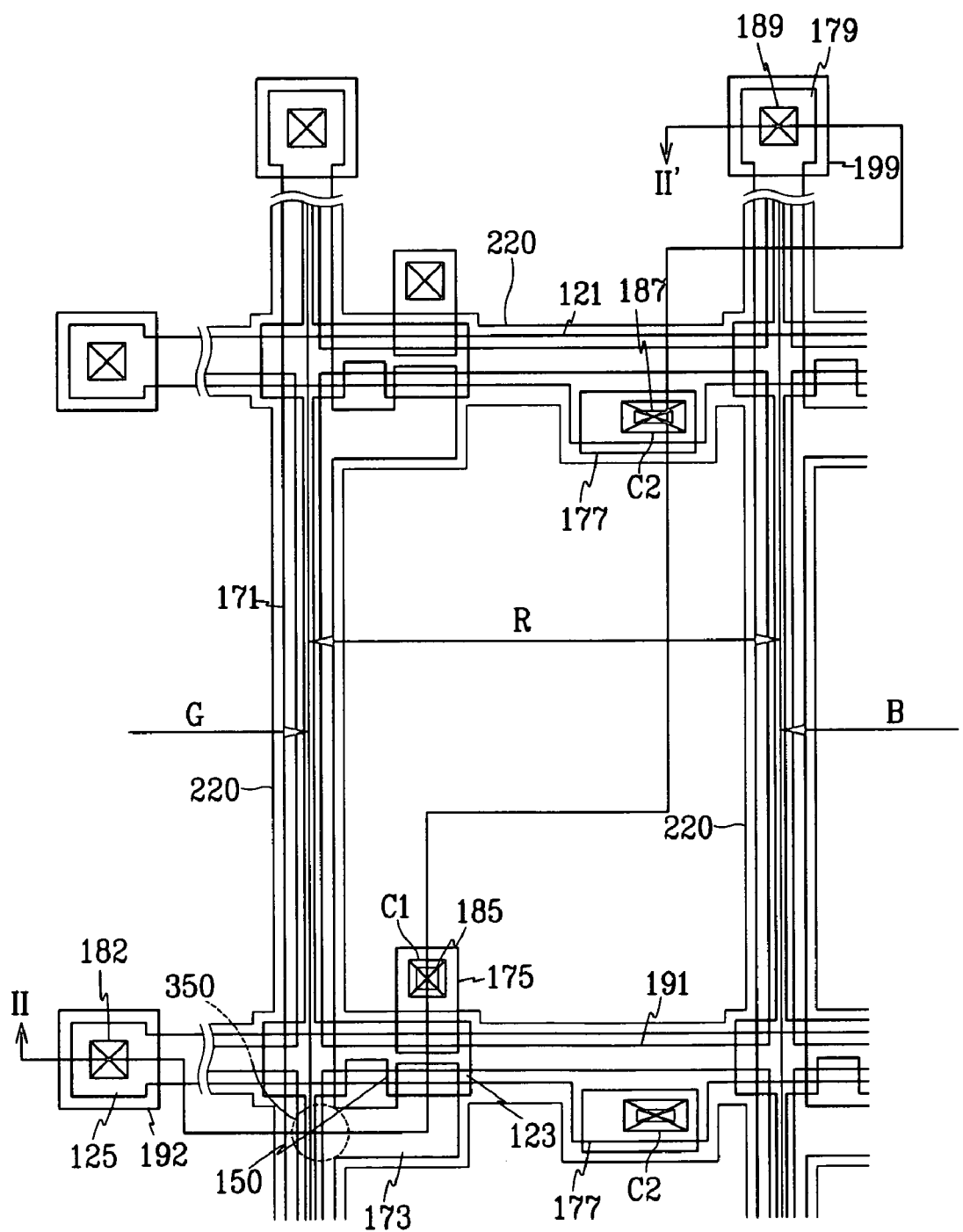
FIG. 1 is a layout view of an LCD according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. Panels for a display device, manufacturing methods thereof, and liquid crystal displays according to embodiments of the present invention will be described with reference to the drawings.

Referring to FIGS. 1 and 2, a TFT array panel for an LCD according to a first embodiment of the present invention will be described in detail.

FIG. 1 is a layout view of an exemplary TFT array panel for an LCD according to the first embodiment of the present invention, and FIG. 2 is a sectional view of the TFT array panel shown in FIG. 1 taken along the line II-II'.

An LCD according to the first embodiment of the present invention includes a lower panel 100, an upper panel 200, a liquid crystal layer 300 interposed therebetween, and a plurality of spacers 350 for supporting the panels 100 and 200 and maintaining a gap between the panels 100 and 200. The LCD is preferably a vertically aligned (VA) mode LCD; that is, liquid crystal molecules in the liquid crystal layer 300 are aligned vertical to surfaces of the panels 100 and 200 in the absence of an electric field due to an aligning force of the alignment layers 13 and 23 or characteristics of the liquid crystal layer 300. However, the LCD may be a twisted nematic (TN) mode LCD where liquid crystal molecules in the liquid crystal layer 300 are aligned parallel to surfaces of the panels 100 and 200 without applied electric field and the molecular orientations are twisted and somewhat upright from the surface of the lower panel 100 to the surface of the upper panel 200.

Regarding the lower panel 100, a plurality of gate lines 121 extending in a direction substantially transverse to the substrate are formed on an insulating substrate 110. The gate lines 121 include either a single layer preferably made of material with low resistivity, such as, for example, Ag, Ag alloy, Al and Al alloy, or multiple layers including such a single layer and a layer made of material with good physical and electrical contact characteristics, such as, for example, Mo, Cr, Ti and Ta. Each gate line 121 has a plurality of expansions, and a plurality of branches of each gate line 121 form gate electrodes 123 of TFTs. The lateral sides of the gate lines 121 are tapered, and the inclination angle of the lateral sides with respect to a horizontal surface ranges from about 20-80 degrees.

According to another embodiment of the present invention, a plurality of storage electrodes (not shown) for storage capacitors that enhance the electrical charge storing capacity are also formed on the substrate 110. A predetermined voltage, such as a common electrode voltage (referred to as a "common voltage" hereinafter) is applied to the storage electrodes from an external source. The common voltage is also applied to a common electrode (not shown) of the other panel (not shown).

A gate insulating layer 140 preferably made of SiNx is formed on the gate lines 121 and the storage electrodes.

A plurality of semiconductor stripes 150 preferably made of hydrogenated amorphous silicon are formed on the gate insulating layer 140, and a plurality of branches of each semiconductor stripe 150 extend onto a plurality of gate electrodes 123 to form channels of TFTs. A plurality of sets of ohmic contact stripes and islands 163 and 165 preferably made of silicide or n+hydrogenated amorphous silicon heavily doped with n type impurity are formed on the semiconductor stripes 150. Each ohmic contact island 165 is separated from and opposite to a respective ohmic contact stripe 163 with respect to a corresponding one of the gate electrodes 123. The lateral sides of the semiconductor stripes 150 and the ohmic contacts 163 and 165 are tapered, and the inclination angles thereof are in the range between about 20-80 degrees.

A plurality of data lines 171, a plurality of drain electrodes 175, and a plurality of storage capacitor conductors 177 are formed on the ohmic contacts 163 and 165 and the gate insulating layer 140. The data lines 171, the drain electrodes 175 and the storage-capacitor conductors 177 preferably include Al and Ag with low resistivity, and may further include Mo, MoW, Cr or Ta having good contact characteristics with other materials. The data lines 171 extend substantially in a longitudinal direction and intersect the gate lines 121, and a plurality of branches of each data line 171 form source electrodes 173 of the TFTs. Each pair of the source electrode 173 and the drain electrode 175 are located at least in part on the relevant ohmic contacts 163 and 165, and separated from and opposite each other with respect to the gate electrodes 123.

The storage-capacitor conductors 177 overlap the expansions of the gate lines 121.

The data lines 171, the drain electrodes 175 and the storage-capacitor conductors 177 have tapered lateral sides, and the inclination angles of the lateral sides range from about 20-80 degrees.

The ohmic contacts 163 and 165 interposed between the semiconductor stripes 150 and the data lines 171 and the drain electrodes 175 reduce the contact resistance therebetween.

A plurality of red, green and blue color filters R, G and B are formed on the data lines 171, the drain electrodes 175, the storage-capacitor electrodes 177 and portions of the semiconductor stripes 150 and the gate insulating layer 140 which are not covered by the data lines 171 and the drain electrodes 175. The color filters R, G and B extend in a longitudinal direction and have a plurality of apertures C1 and C2 that expose the drain electrodes 175 and the storage-capacitor conductors 177. In this embodiment, the boundaries of the color filters R, G and B coincide and are located on the data lines 171. In other embodiments, the color filters R, G and B overlap each other on the data lines 171 to block the light leakage. The color filters R, G and B do not exist near pad areas provided with end portions 125 and 179 of the gate lines 121 and the data lines 171.

An interlayer insulating layer (not shown) preferably made of SiOx or SiNx and that cover the exposed portions of the semiconductor stripes 150 may be formed under the color filters R, G and B.

A passivation layer 180 is formed on the color filters R, G and B. The passivation layer 180 is preferably made of an acryl-based organic insulating material having an excellent planarization characteristic and a low dielectric constant, or a low dielectric insulating material such as SiOC or SiOF formed by a chemical vapor deposition and having a low dielectric constant equal to or lower than 4.0. The passivation layer 180 has a plurality of contact holes 189, 185 and 187 that expose the end portions 179 of the data lines 171, the drain electrodes 175 and the storage-capacitor conductors 177, respectively. When the interlayer insulating layer is disposed under the color filters R, G and B as mentioned above, the contact holes 185 and 187 have the same planar shapes as those of the interlayer insulating layer. The passivation layer 180 and the gate insulating layer 140 have other contact holes 182 that expose the end portions 125 of the gate lines 121. The contact holes 185 and 187 that expose the drain electrodes 175 and the storage-capacitor conductors 177 are positioned within the apertures C1 and C2 of the color filters R, G and B. The contact holes 182 and 189 are provided for electrical connection between the signal lines 121 and 171 and the driving circuits therefor.

The contact holes 187, 182, 185 and 189 of the passivation layer 180 and the apertures C1 and C2 have tapered sidewalls. The inclination angles of the sidewalls of the contact holes 187, 182, 185 and 189 may be different, and the inclination angle of the upper or the inner sidewall is preferably smaller than the lower or the outer sidewall. The inclination angles of the sidewalls with respect to a horizontal surface are preferably about 30-180 degrees. According to another embodiment, the contact holes 185 and 187 have a larger size than the apertures C1 and C2 to further have a stepwise sidewall. These contact structures ensure the smooth profile of films in the contact holes 187 and 185.

A plurality of pixel electrodes 191 preferably made of transparent conductive material such as indium tin oxide ("ITO") or indium zinc oxide ("IZO") are formed on the passivation layer 180. The pixel electrodes 191 are physically and electrically connected to the drain electrodes 175 via the contact holes 185 and connected to the storage-capacitor conductors 177 via the contact holes 187. The storage-capacitor conductors 177 and the expansions of the gate lines 121 form storage capacitors.

Each pixel electrode 191 is applied with voltages from the data lines 171 to generate electric fields in cooperation with a common electrode provided on the upper panel 200. Variation of the applied voltage changes the orientations of liquid crystal molecules in the liquid crystal layer 300 between the two field-generating electrodes. In view of electrical circuits, each electrode 191 and the reference electrode forms a capacitor with a liquid crystal dielectric for storing electrical charges.

The electrodes 191 overlap the gate lines 121 and the data lines 171 to increase aperture ratio and to form a plurality of storage capacitors, connected parallel to the liquid crystal capacitors, for enhancing the charge storing capacity thereof.

Furthermore, a plurality of contact assistants 192 and 199 are formed on the passivation layer 180. The contact assistants 192 and 199 are connected to the exposed end portions 125 and 179 of the gate and the data lines 121 and 171 through the contact holes 182 and 189, respectively. The contact assistants 192 and 199 are not requisites but preferred to protect the exposed portions 125 and 179 of the gate and the data lines 121 and 171 and to complement the adhesiveness of the TFT array panel and the driving ICs. The contact assistants 192 and 199 can be made of the same layer as the transparent electrodes 191, or as a reflecting electrode.

According to another embodiment of the present invention, a plurality of metal islands (not shown) preferably made of the same material as the gate lines 121 or the data lines 171 are provided near the end portions of the gate and/or the data lines 121 and 171. The metal islands are connected to the contact assistants 192 or 199 via a plurality of contact holes provided at the gate insulating layer 140 and/or the passivation layer 180.

A black matrix 220 that blocks light leakage near the edges of the pixel areas is formed on an insulating substrate 210 of the upper panel 200 opposite the lower panel 100. The black matrix 220 has a plurality of openings facing the pixel areas enclosed by the gate lines 121 and the data lines 171 and is preferably made of organic material containing black die. The black matrix 220 is also disposed near edges of a display area, which is a collection of the pixel areas that display images, for blocking the light leakage. In addition, the black matrix 220 is disposed on the TFTs for blocking the light incident on the semiconductors 150 of the TFTs.

A common electrode 230 that generates an electric field for driving the liquid crystal molecules in cooperation with the pixel electrodes 191 of the lower panel 100 is formed on the upper panel 200 provided with the black matrix 220. The common electrode 230 is preferably made of transparent conductive material.

The spacers 350 are disposed on the common electrode 230 opposite the black matrix 220. A plurality of protrusions 355 for divisional alignment of the liquid crystal molecules 310 are formed on the pixel areas. The protrusions 355 are preferably made of the same layer as the spacers 350. The liquid crystal layer 300 has negative dielectric anisotropy and the liquid crystal molecules 310 are aligned vertical to surfaces of the panels 100 and 200 in the absence of an electric field due to an aligning force of alignment layers 13 and 23 or characteristics of the liquid crystal layer 300. The liquid crystal molecules 310 near the surface of the upper panel 200 are aligned vertical to inclined surfaces of the protrusions 355 so that their orientations are different. Although the planar shapes of the protrusions 355 are not shown in FIG. 1, the protrusions 355 can have various shapes for aligning the liquid crystal molecules 310 along various directions.

The gap between the panels 100 and 200 of the LCD is determined by the thickness of the spacers 350 and the black matrix 220.

Now, a method of manufacturing an LCD according to the first embodiment of the present invention is described in detail.

First, a manufacturing method for an upper panel (also referred to as an opposite panel) 200 for an LCD according to the first embodiment of the present invention will be described in detail with reference to FIGS. 3A to 3C.

Figure 3A:
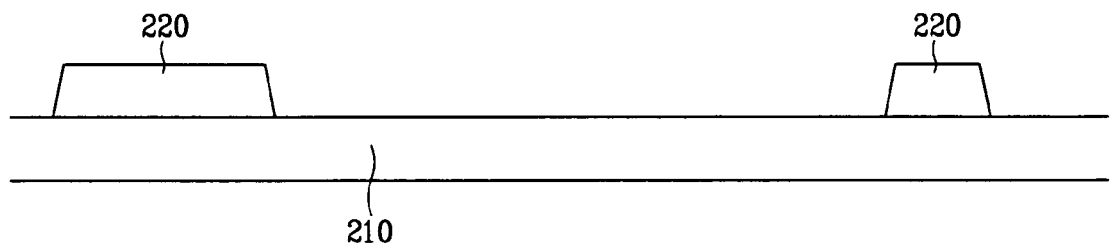
FIGS. 3A-3C are sectional views of an upper panel of the LCD shown in FIGS. 1 and 2, which show steps of a manufacturing method according to the first embodiment of the present invention.

Referring to FIG. 3A, a photosensitive organic material containing black die is coated on an insulating substrate 210, and exposed to light and developed using photolithography to form a black matrix 220. The thickness of the black matrix 220 is preferably in a range of about 1.5-3.0 microns, and the black matrix 220 has a plurality of openings defining pixel areas and blocks the light leakage near edges of a display area.

Figure 3B:
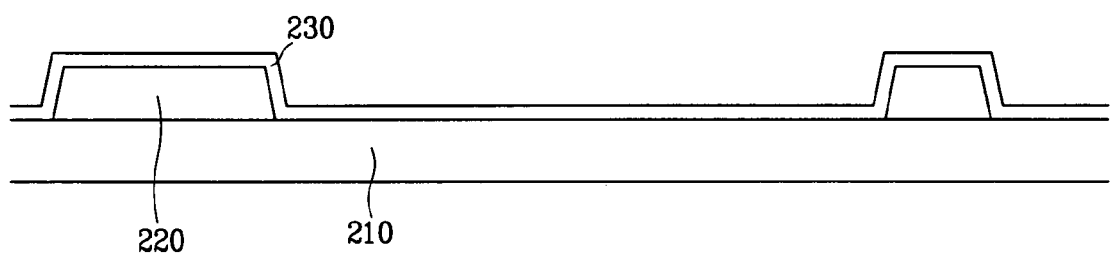

Referring to FIG. 3B, a transparent conductive material, such as, for example, indium tin oxide (ITO) and indium zinc oxide (IZO) is deposited over the black matrix 220 and the substrate 210 to form a common electrode 230.

Figure 3C:
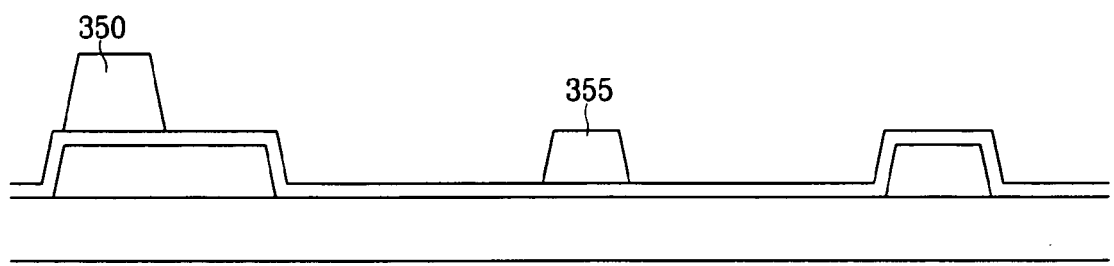

Referring to FIG. 3C, a photosensitive acrylic organic material is coated over the common electrode and is exposed to light and developed to form a plurality of spacers 350 opposite the black matrix 220 and a plurality of protrusions 355 for divisional alignment of liquid crystal molecules on the pixel areas. The thicknesses of the spacers 350 and the protrusions 355 are almost equal to each other, but it is preferable that the spacers 350 are made thicker than the protrusions 355 by controlling process conditions or by adjusting the widths of the spacers 350 or the protrusions 355.

Finally, an upper alignment layer 23 is formed on the upper panel 200.

The above-described manufacturing method simultaneously forms the protrusions 355 and the spacers 350, preferably with substantially the same thickness, thereby providing a simplified manufacturing process. In addition, since the black matrix 220 contributes to the gap between the panels 100 and 200, the spacers 350 can have reduced thickness and it is easy to uniformly control the thickness of the spacers 350.

Now, a method of manufacturing a TFT array panel for an LCD according to the first embodiment of the present invention will be described in detail with reference to FIGS. 4A to 8B and FIGS. 1 and 2.

FIGS. 4A, 5A, 6A, 7A and 8A are layout views of a TFT array panel for an LCD in the respective steps of a manufacturing method thereof according to an embodiment of the present invention, and FIGS. 4B, 5B, 6B, 7B and 8B are sectional views of the TFT array panel shown in FIGS. 4A, 5A, 6A, 7A and 8A taken along the lines IVB-IVB', VB-VB', VI-VI', VIIB-VIIB' and VIIIB-VIIIB', respectively.

Figure 4A:
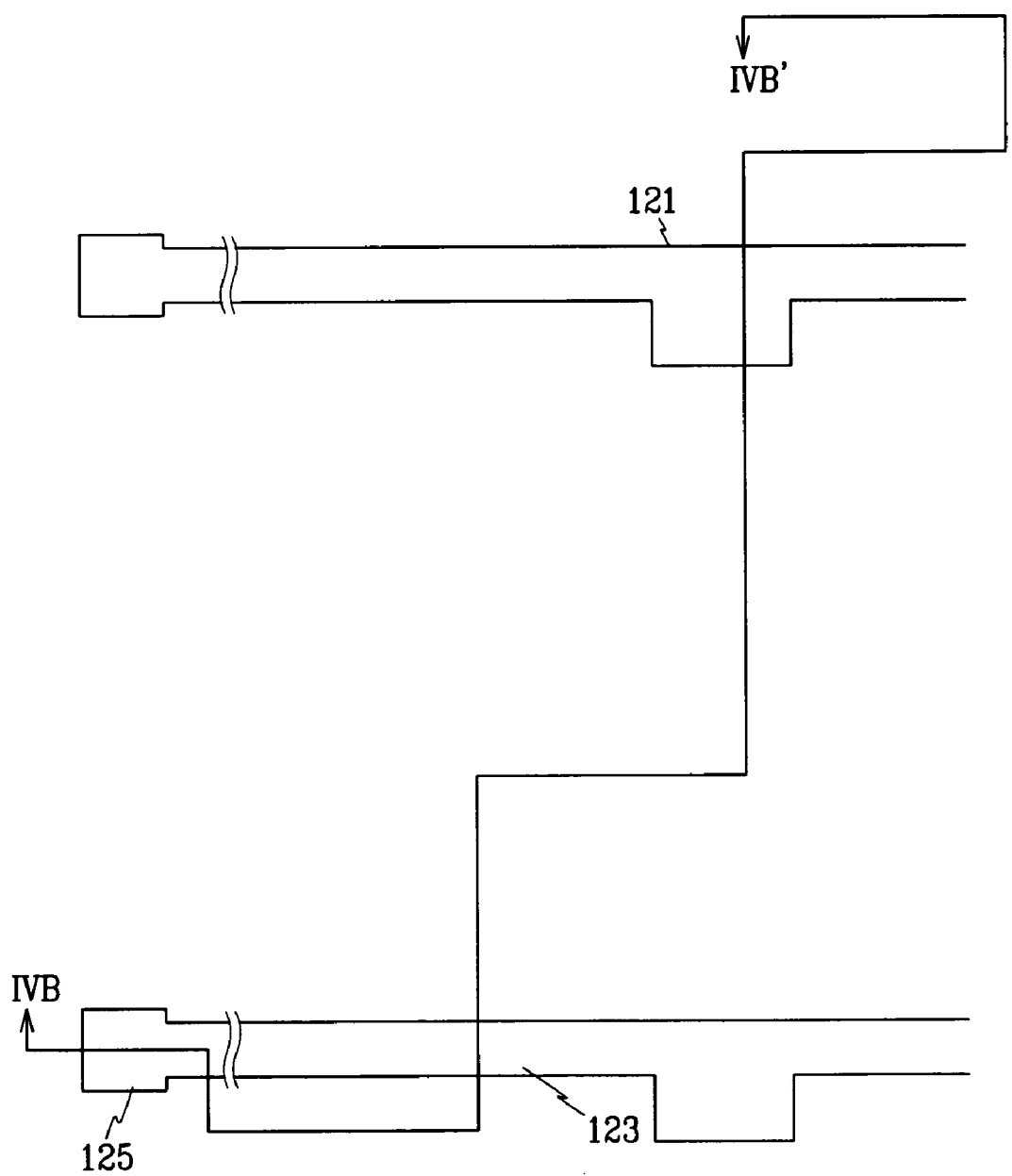
FIG. 4A is a layout view of the TFT panel in one step according to the first embodiment of the present invention.

As shown in FIGS. 4A and 4B, a plurality of gate lines 121 including a plurality of gate electrodes 123 are formed on a glass substrate 110 by photo etching.

Figure 5A:
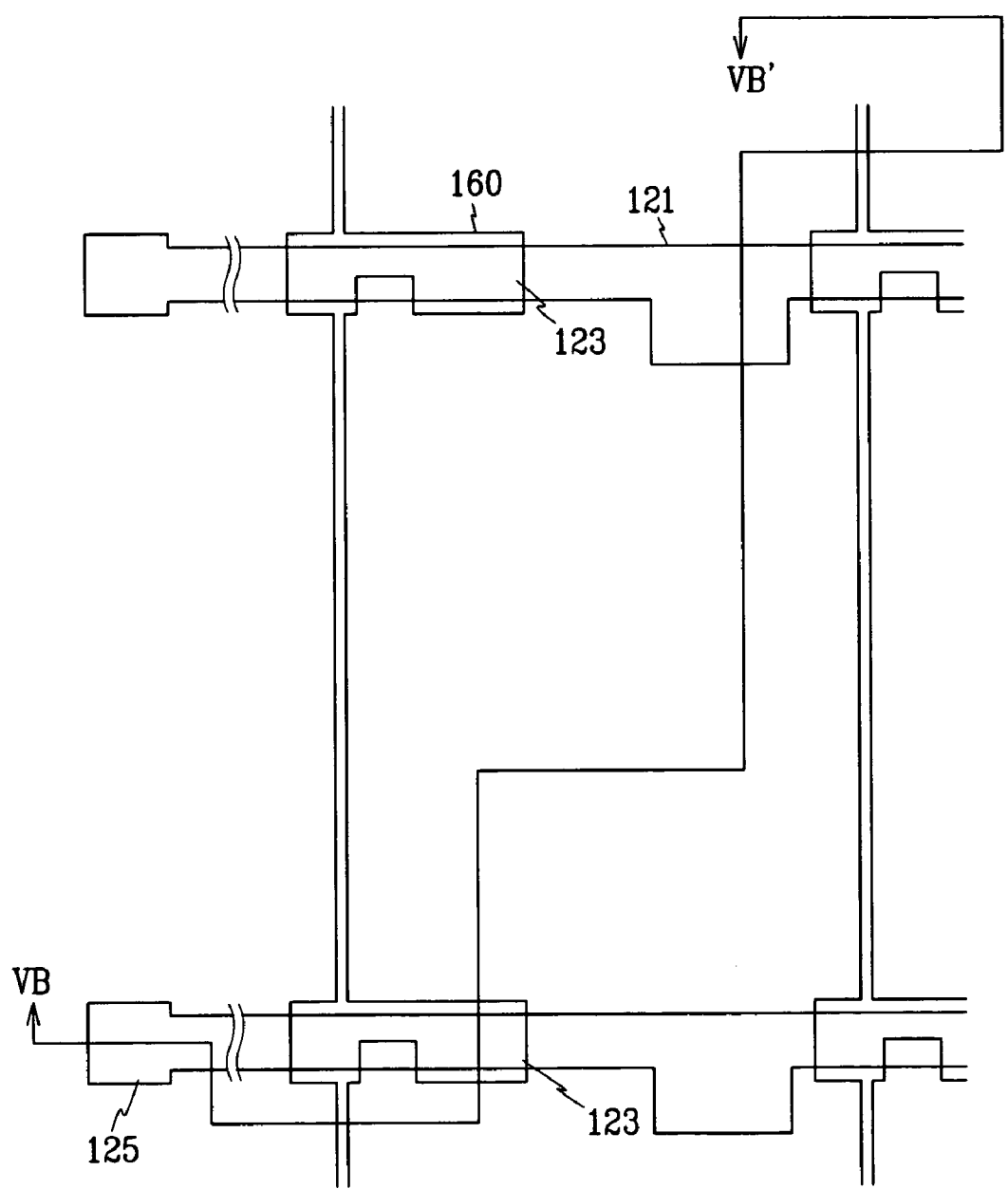
FIG. 5A is a layout view of the TFT array panel in another step according to the first embodiment of the present invention.
Figure 5B:
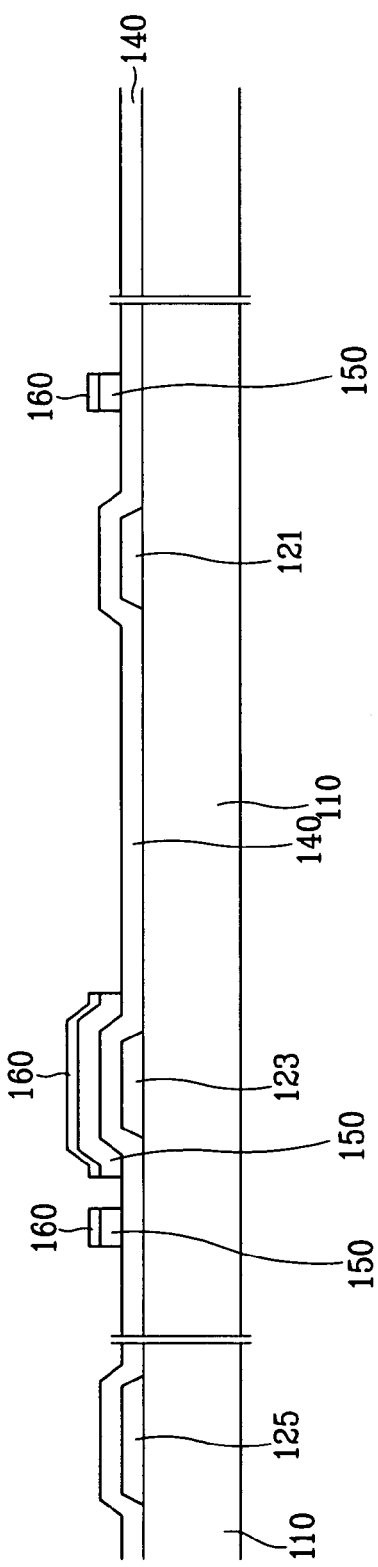
FIG. 5B is a sectional view taken along the line VB-VB' in FIG. 5A.

As shown in FIGS. 5A and 5B, after sequentially depositing a gate insulating layer 140, an amorphous silicon layer, and a doped amorphous silicon layer, the doped amorphous silicon layer and the amorphous silicon layer are photo-etched to form a plurality of semiconductor stripes 150 and a plurality of doped amorphous silicon stripes 160 on the gate insulating layer 140.

Figure 6A:
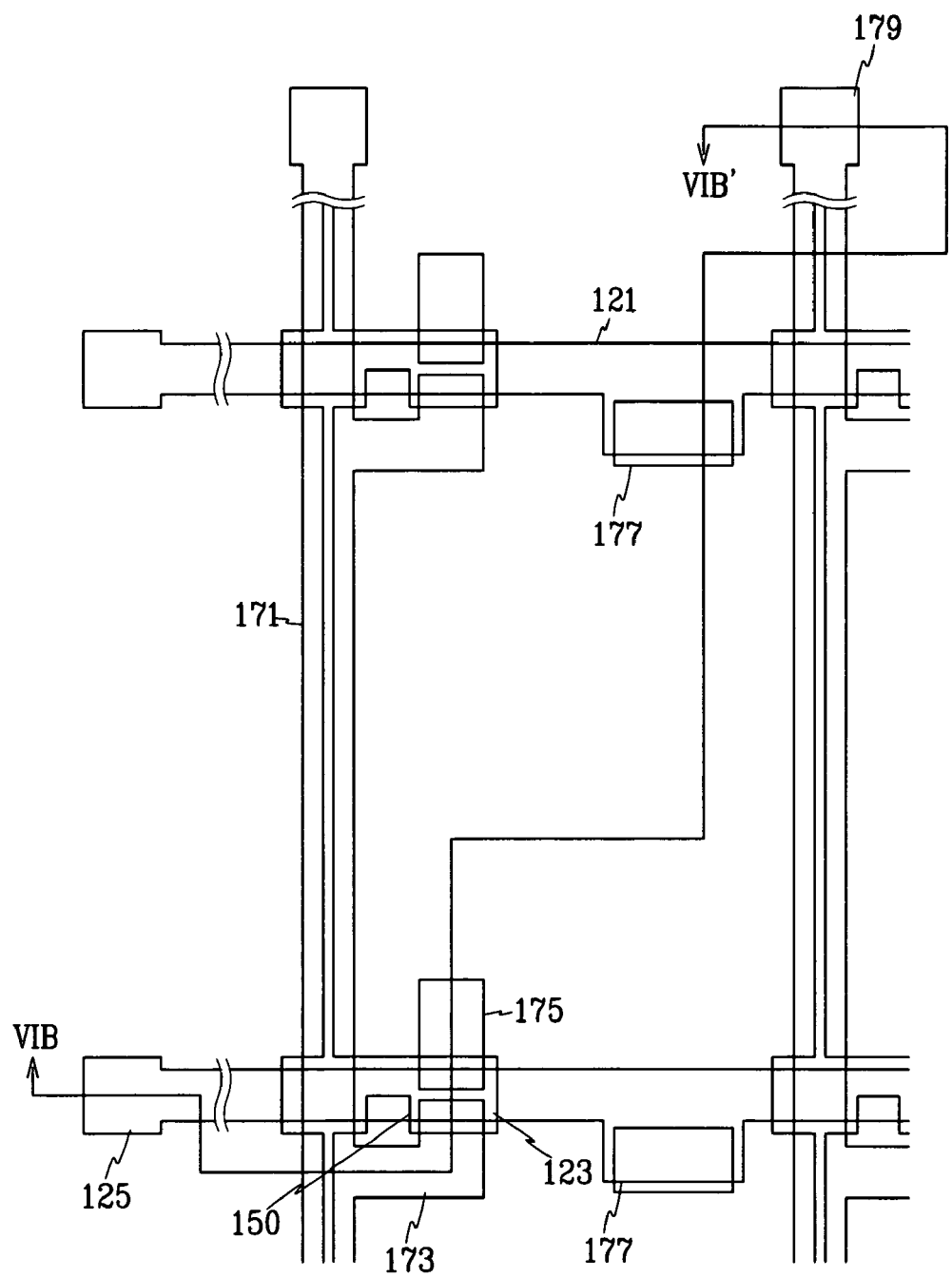
FIG. 6A is a layout view of the TFT array panel in another step according to the first embodiment of the present invention.
Figure 6B:
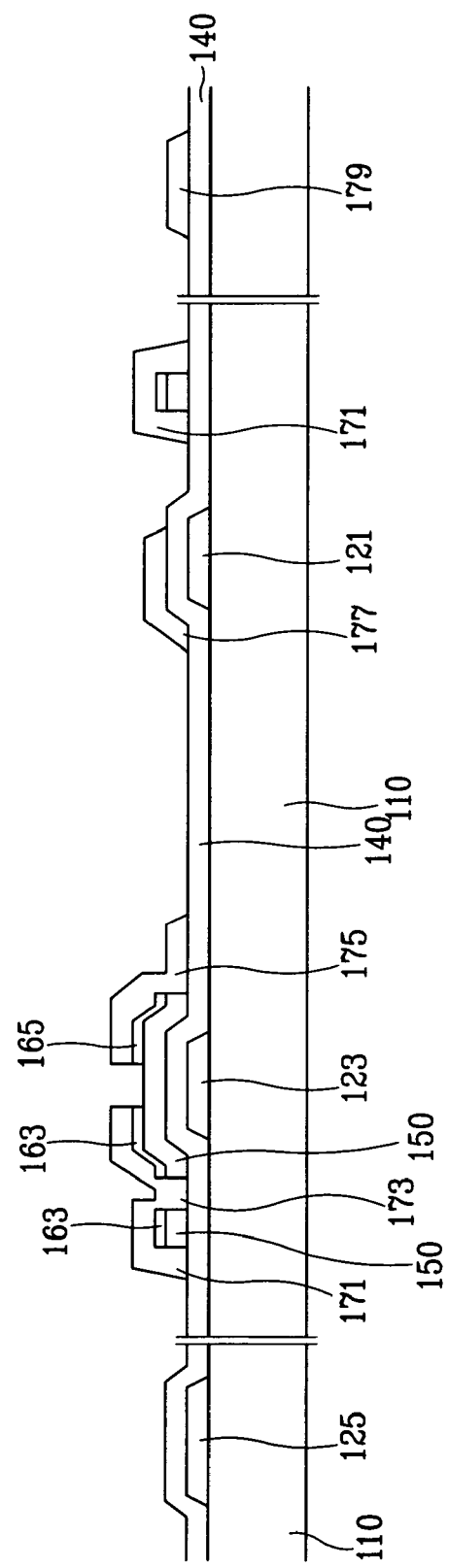
FIG. 6B is a sectional view taken along the line VIB-VIB' in FIG. 6A.

As shown in FIGS. 6A and 6B, a plurality of data lines 171 including a plurality of source electrodes 173, a plurality of drain electrodes 175, and a plurality of storage-capacitor conductors 177 are formed by photo etching. Thereafter, portions of the doped amorphous silicon stripes 160, which are not covered by the data lines 171 and the drain electrodes 175, are removed such that each doped amorphous silicon island 160 is separated into an ohmic contact stripe 163 and a plurality of ohmic contact islands 165 to expose a portion of the underlying semiconductor stripe 150 located therebetween. Oxygen plasma treatment is preferably performed to stabilize the exposed surfaces of the semiconductor stripes 150.

Figure 7A:
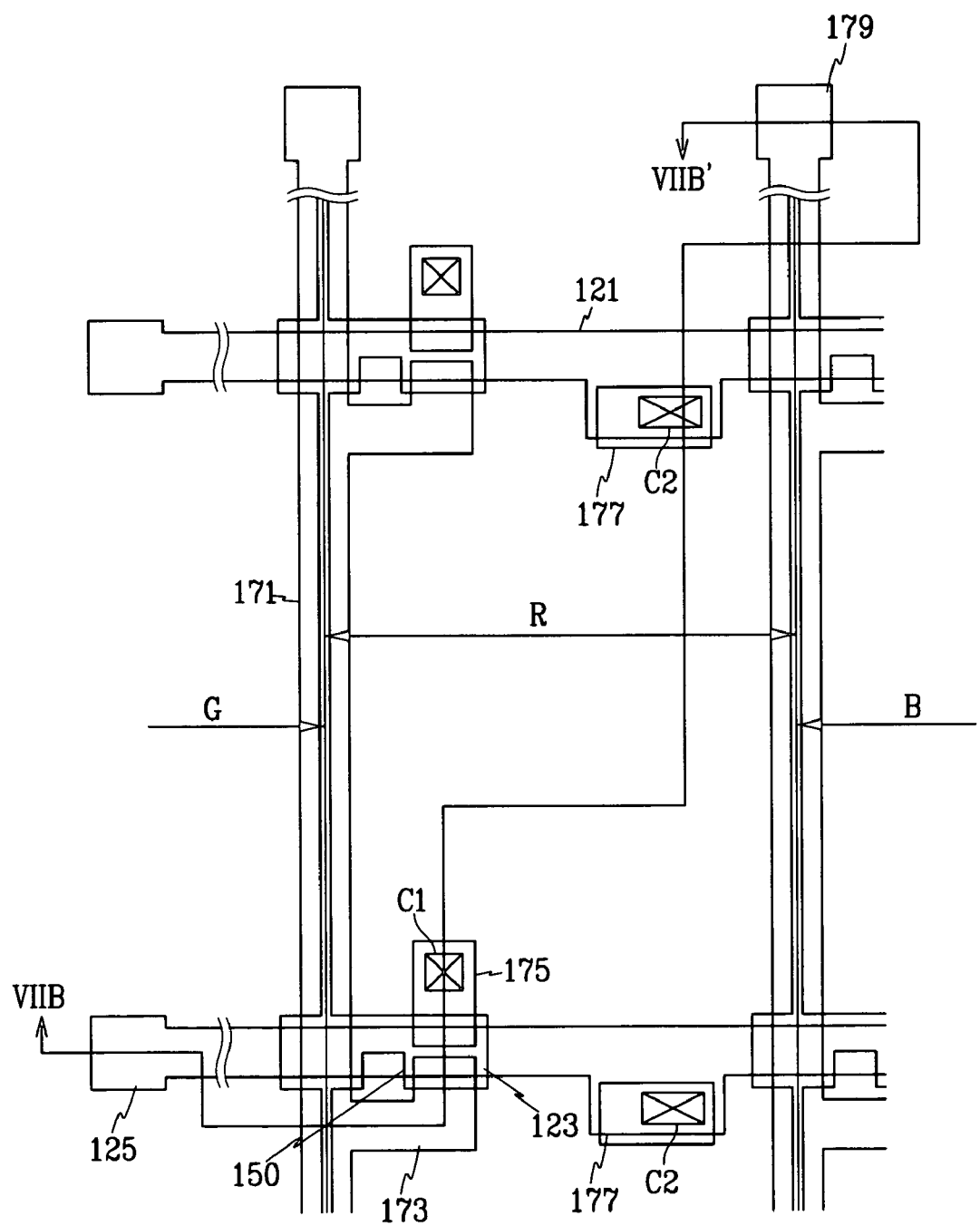
FIG. 7A is a layout view of the TFT array panel in still another step according to the first embodiment of the present invention.
Figure 7B:
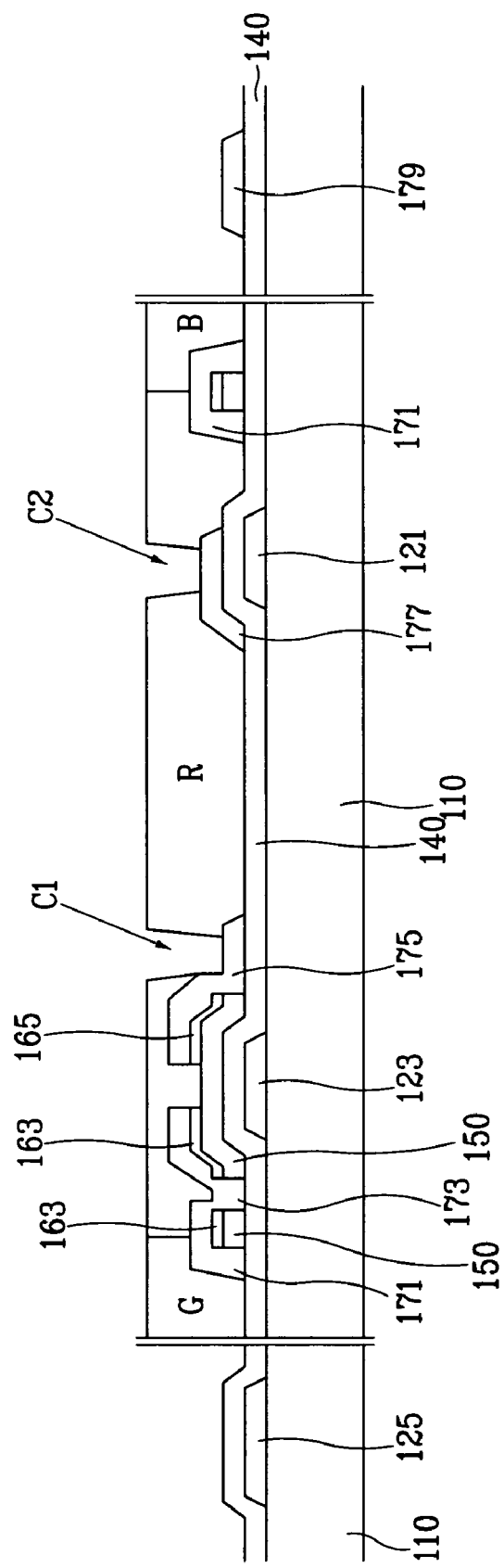
FIG. 7B is a sectional view taken along the line VIIB-VIIB' in FIG. 7A.

After forming an interlayer insulating layer (not shown) preferably made of silicon nitride, as shown in FIGS. 7A and 7B, photosensitive organic materials including red, green and blue pigments are sequentially coated by photolithography to form a plurality of color filters R, G and B having a plurality of contact holes C1 and C2.

Figure 8A:
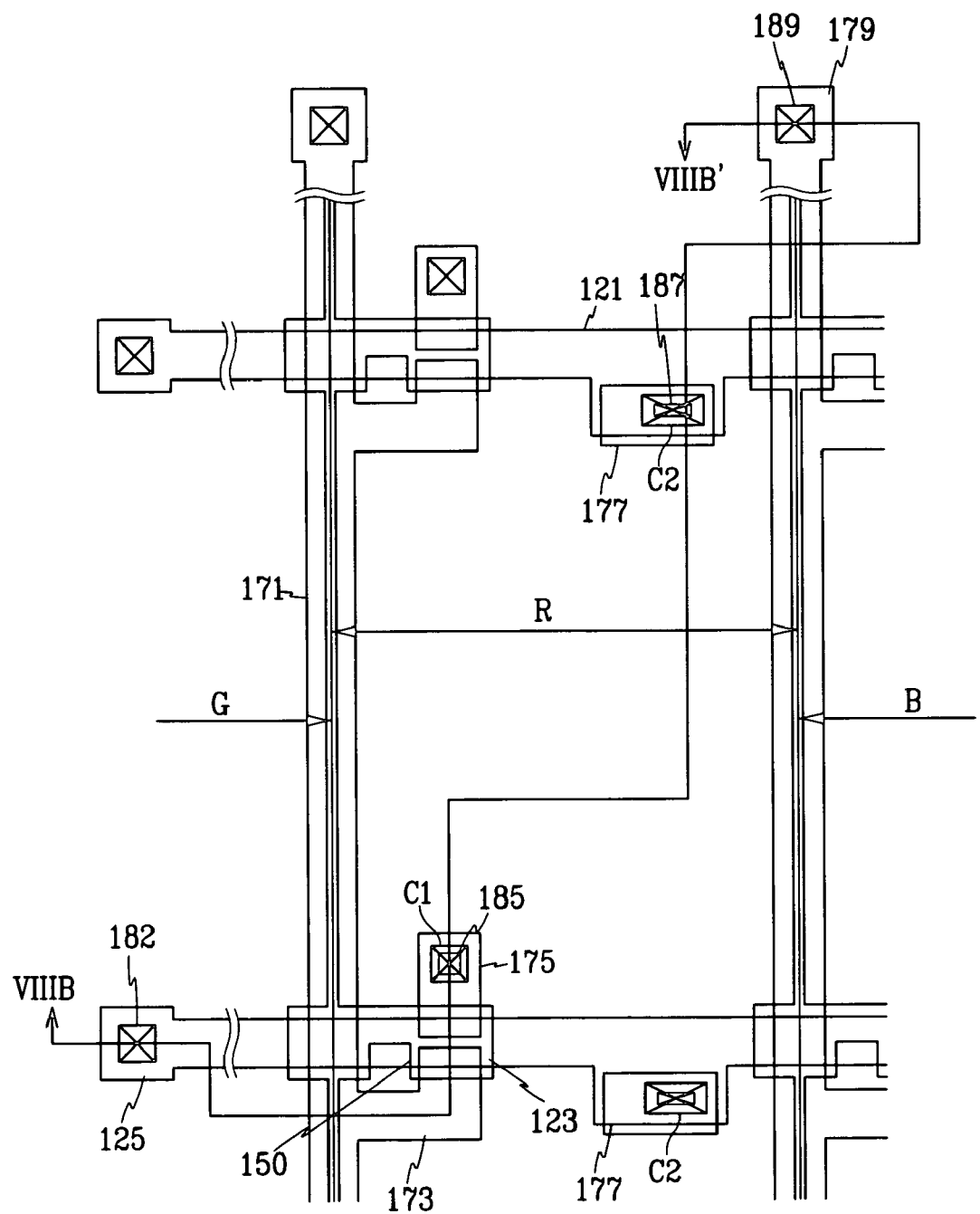
FIG. 8A is a layout view of the TFT array panel in another step according to the first embodiment of the present invention.
Figure 8B:
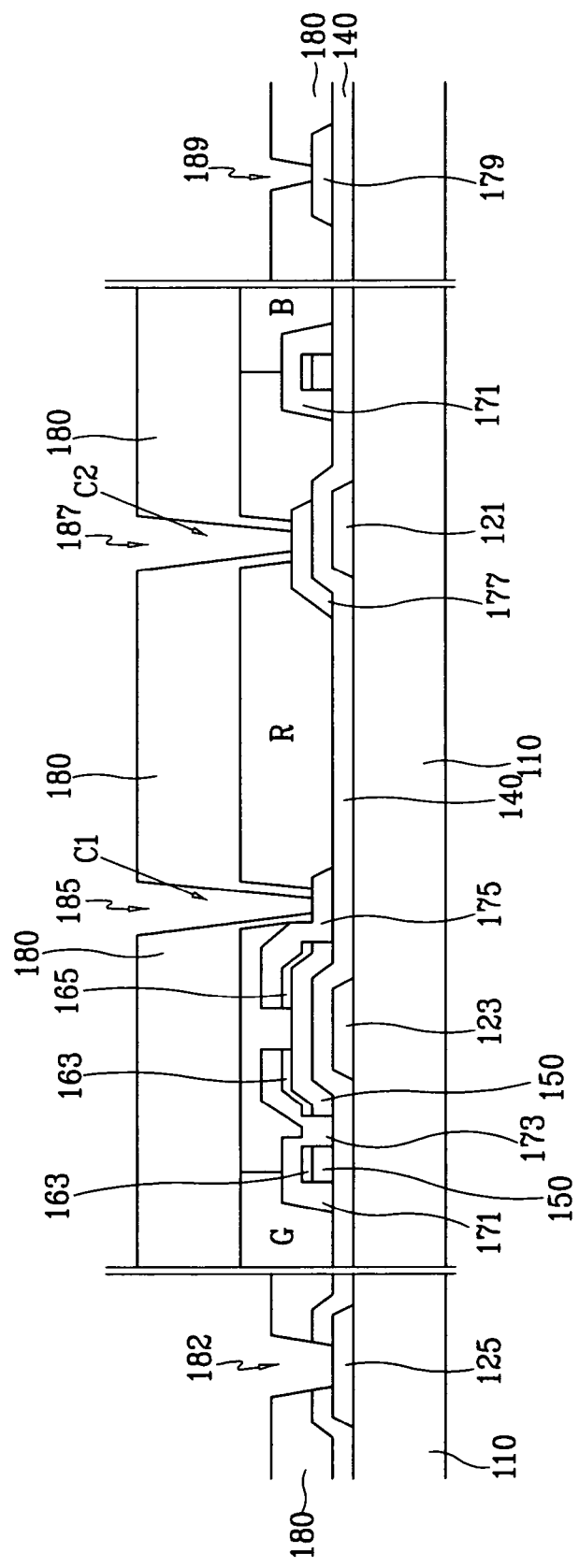
FIG. 8B is a sectional view taken along the line VIIIB-VIIIB' in FIG. 8A.

As shown in FIGS. 8A and 8B, a passivation layer 180 is deposited and patterned along with the gate insulating layer 140 to form a plurality of contact holes 187, 182, 185 and 189. The contact holes 185 and 182 exposing the drain electrodes 175 and the storage-capacitor conductors 177 are located within the apertures C1 and C2 provided at the color filters R, G and B.

As described above, by providing the apertures C1 and C2 on the color filters R, G and B in advance and then patterning the passivation layer 180 to form the contact holes 185 and 182 exposing the drain electrodes 175 and the storage-capacitor conductors 177, it is possible to obtain a good profile of the contact holes 185 and 187.

In addition, since the larger size of the contact holes 185 and 187 compared with the apertures C1 and C2 makes the sidewalls of the contact holes 185 and 187 and the apertures C1 and C2 have step-wise shapes, the smooth profiles of other films to be formed later is obtained.

Finally, as shown in FIGS. 1 and 2, a plurality of pixel electrodes 191 and a plurality of contact assistants 192 and 199 are formed over the passivation layer 180 by photo etching ITO or IZO which is deposited with a thickness of about 400-600 Å, and a lower alignment layer 13 is formed thereon.

A TFT array panel for an LCD according to a second embodiment of the present invention will be described in detail with reference to FIGS. 9 to 11.

Figure 9:
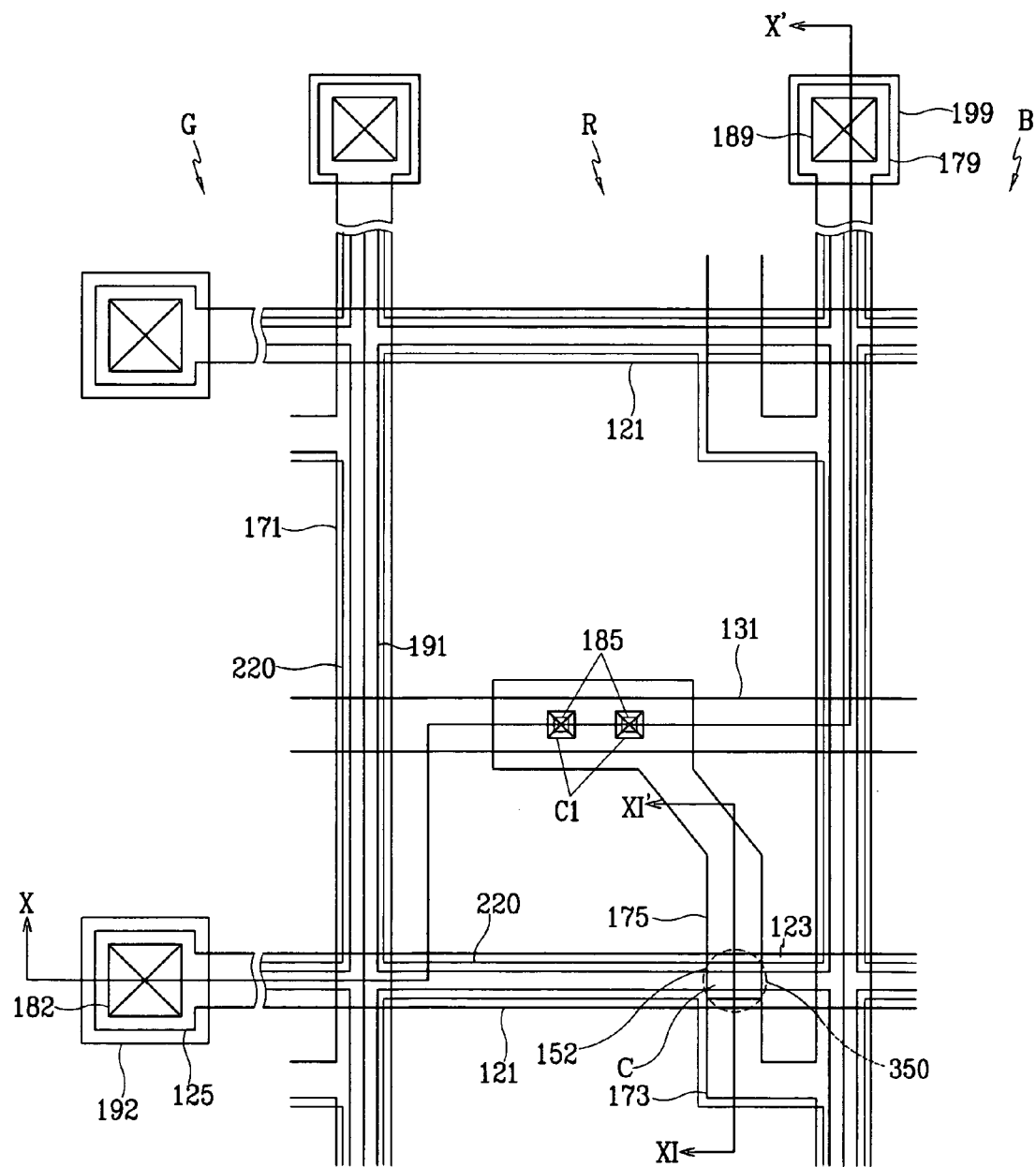
FIG. 9 is a layout view of a TFT array panel for an LCD according to a second embodiment of the present invention.
Figure 10:
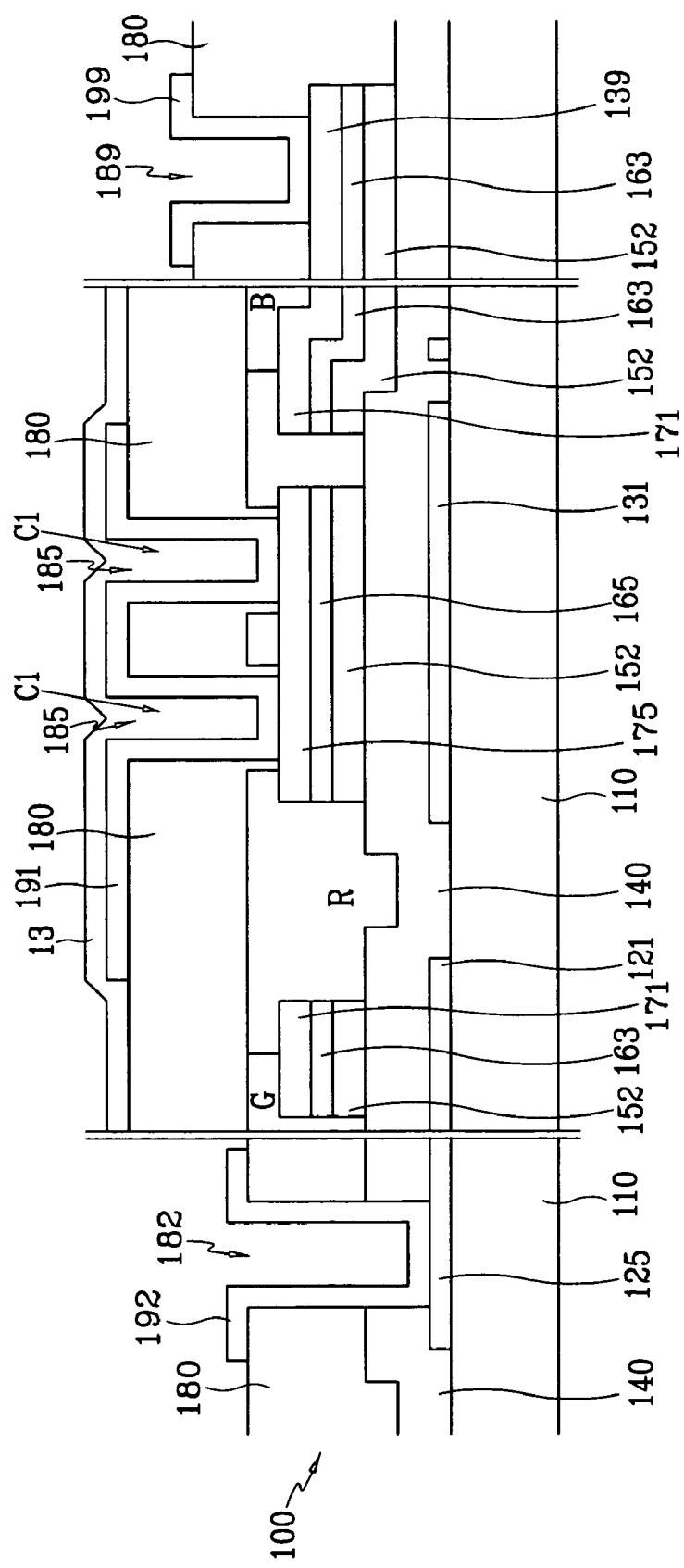

FIG. 9 is a layout view of an LCD according to the second embodiment of the present invention, and FIGS. 10 and 11 are sectional views of the TFT array panel shown in FIG. 9 taken along the lines X-X' and XI-XI'. An upper panel of the LCD shown in FIG. 9 has a structure similar to that according to the first embodiment and thus its sectional view is not shown in the figures.

As shown in FIGS. 9-11, a TFT array panel according to the second embodiment of the present invention includes a plurality of storage electrode lines 131 formed on an insulating substrate 110. The storage electrode lines 131 include the same layer as the gate lines 121, extend substantially parallel to the gate lines 121 and are electrically separated from the gate lines 121. The storage electrode lines 131 are applied with a predetermined voltage such as a common voltage, and overlap a plurality of drain electrodes 175, which are connected to a plurality of pixel electrodes 191, via the gate insulating layer 140 to form storage capacitors. The storage electrode lines 131 may be omitted if the storage capacitance due to the overlapping of the gate lines 121 and the pixel electrodes 191 are sufficient.

A plurality of semiconductor stripes and islands 152 and a plurality of ohmic contacts 163 and 165 are provided.

The semiconductor stripes 152 have almost the same planar shapes as a plurality of data lines 171 and a plurality of drain electrodes 175 except for channel areas C of TFTs. That is, although the data lines 171 are disconnected from the drain electrodes 175 on the channel areas C, the semiconductor stripes 152 are continuous on the channel areas C to form channels of the TFTs. The ohmic contacts 163 and 165 have substantially the same planar shapes as the data lines 171 and the drain electrodes 175 thereover.

The gate lines 121, the storage electrode lines 131, the semiconductor stripes 152, and the ohmic contacts 163 and 165 have tapered lateral surfaces.

Since contact holes 185 are larger than openings C1, the contact structures have stepwise sidewalls.

As shown in FIG. 9, a black matrix 220 provided on the upper panel is narrower than the data lines 171 and a plurality of spacers 350 are formed on TFTs.

Now, a method of manufacturing the TFT array panel for an LCD according to the second embodiment of the present invention will be described in detail with reference to FIGS. 12A to 19C and FIGS. 9 to 11.

FIG. 12A, 14A, 18A and 19A are layout views of a TFT array panel for a transmissive type LCD in the respective steps of a manufacturing method thereof according to the second embodiment of the present invention. FIGS. 12B and 13A and FIGS. 12C and 13B are sectional views of the TFT array panel shown in FIG. 12A taken along the lines XIIB-XIIB' and XIIC-XIIC', respectively, and sequentially illustrate a manufacturing method thereof according to the second embodiment of the present invention. FIGS. 14B, 15A, 16A and 17A and FIGS. 14C, 15B, 16B and 17B are sectional views of the TFT array panel shown in FIG. 14A taken along the lines XIVB-XIVB' and XIVC-XIVC', respectively, and sequentially illustrate a manufacturing method thereof according to the second embodiment of the present invention. FIGS. 18B and 18C are sectional views of the TFT array panel shown in FIG. 18A taken along the lines XVIIIB-XVIIIB' and XVIIIC-XIVIIC', respectively, and FIGS. 19B and 19C are sectional views of the TFT array panel shown in FIG. 19A taken along the lines XIXB-XIXB' and XIXC-XIXC', respectively.

Figure 12A:
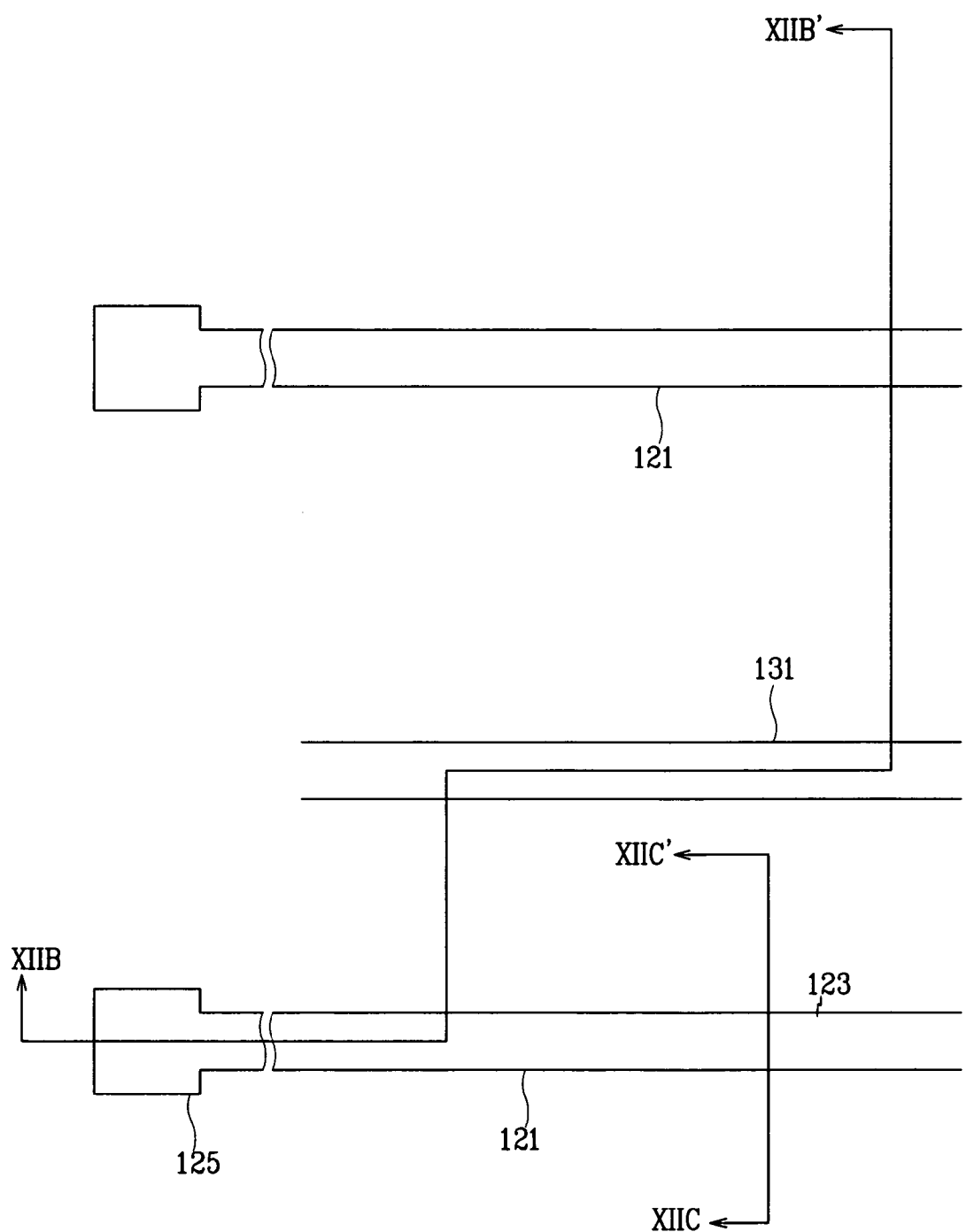
FIG. 12A is a layout view of the TFT array panel in a step of manufacture according to a second embodiment of the present invention.
Figure 12C:
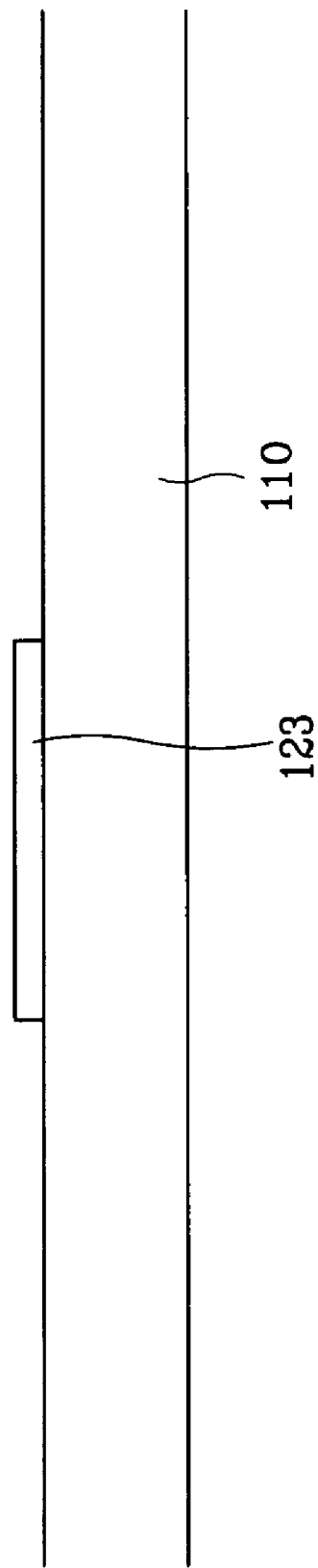

As shown in FIGS. 12A to 12C, a conductive layer is deposited with a thickness of about 1,000-3,000 Å on a substrate 110 and patterned by photolithography and etching to form a plurality of gate lines 121 and a plurality of storage electrode lines 131.

Figure 13A:
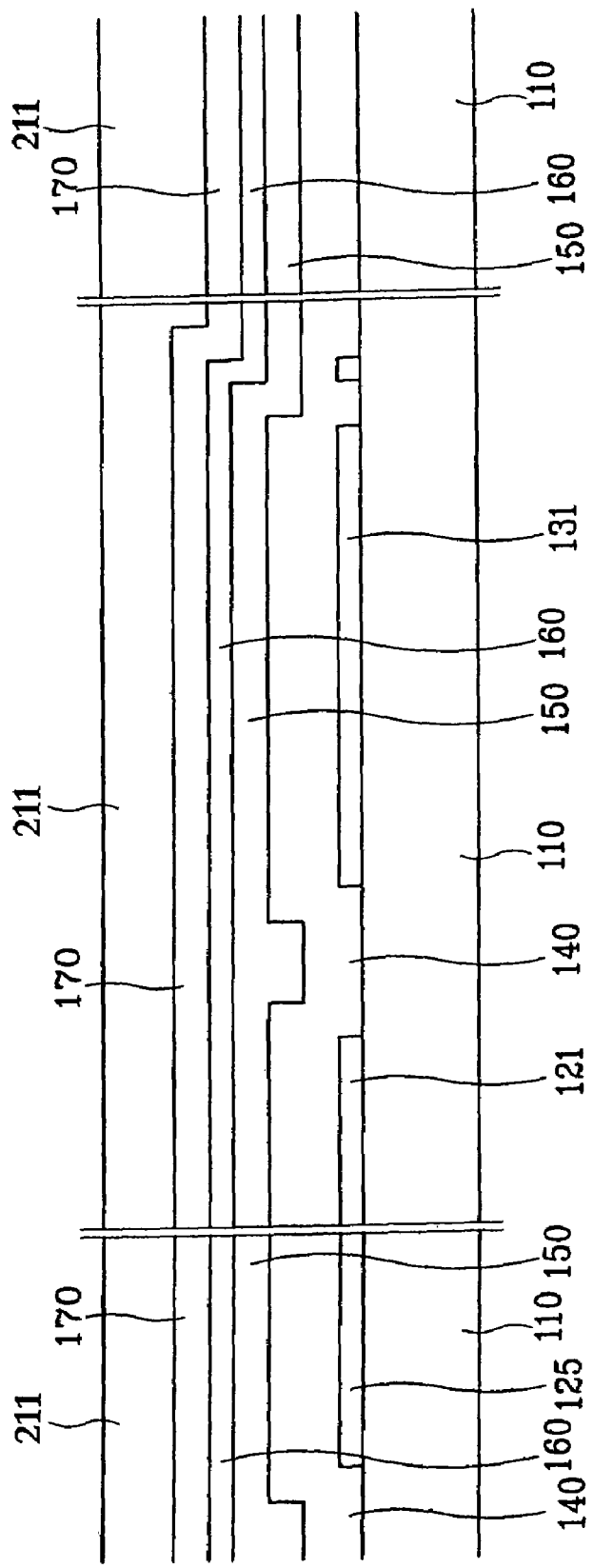
FIGS. 13A and 13B are sectional views taken along the lines XIIB-XIIB' and XIIC-XIIC' in FIG. 12A, respectively, which show another step of manufacture according to the second embodiment of the invention.
Figure 13B:
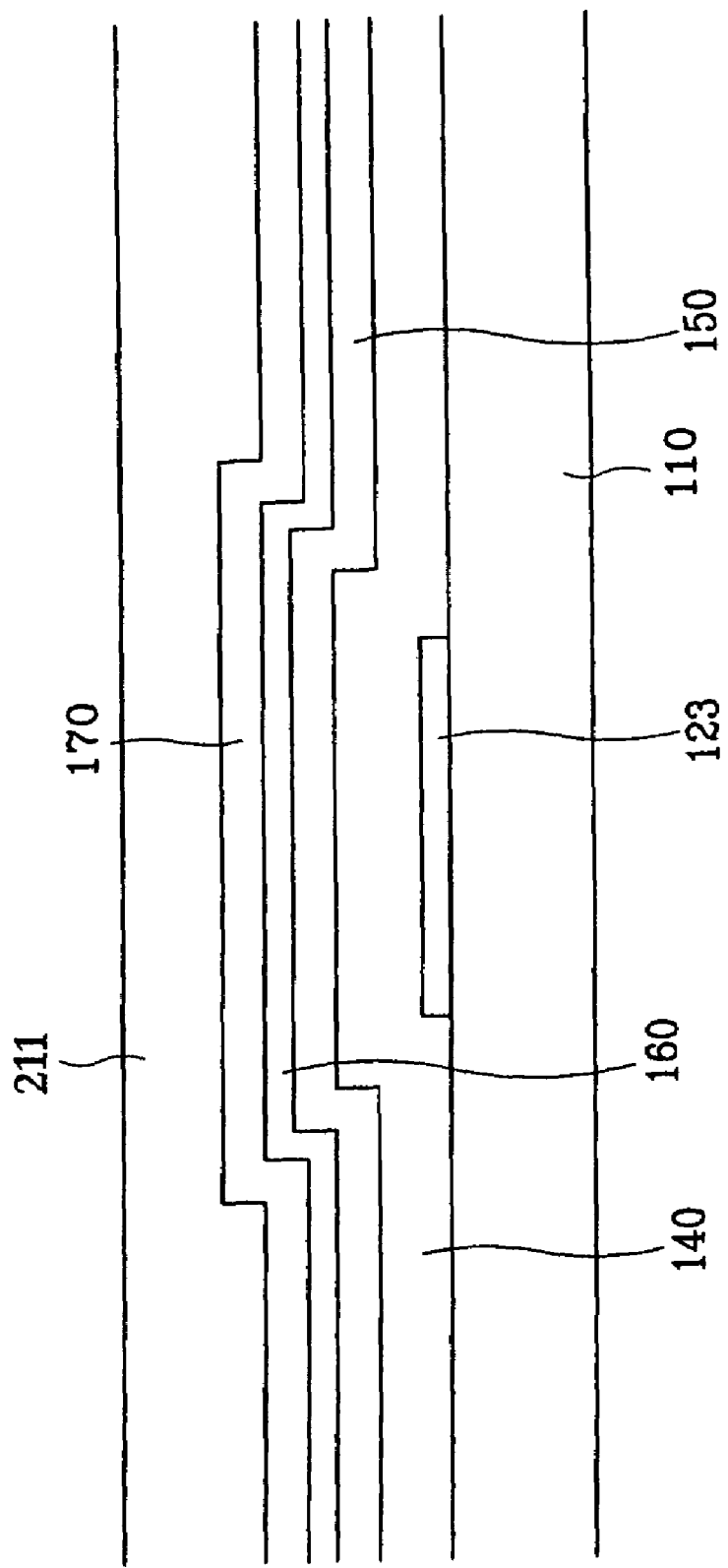

As shown in FIGS. 13A and 13B, a gate insulating layer 140, a semiconductor layer 150, and a doped amorphous silicon layer 160 are sequentially deposited by CVD such that the layers 140, 150 and 160 have a thickness of about 1,500-5,000 .ANG., about 500-2,000 .ANG. and about 300-600 .ANG. , respectively. A conductive layer 170 having a thickness of about 1,500-3,000 .ANG. is deposited by sputtering, and a photoresist film 211 having a thickness of about 1-2 microns is coated on the conductive layer 170.

Figure 14A:
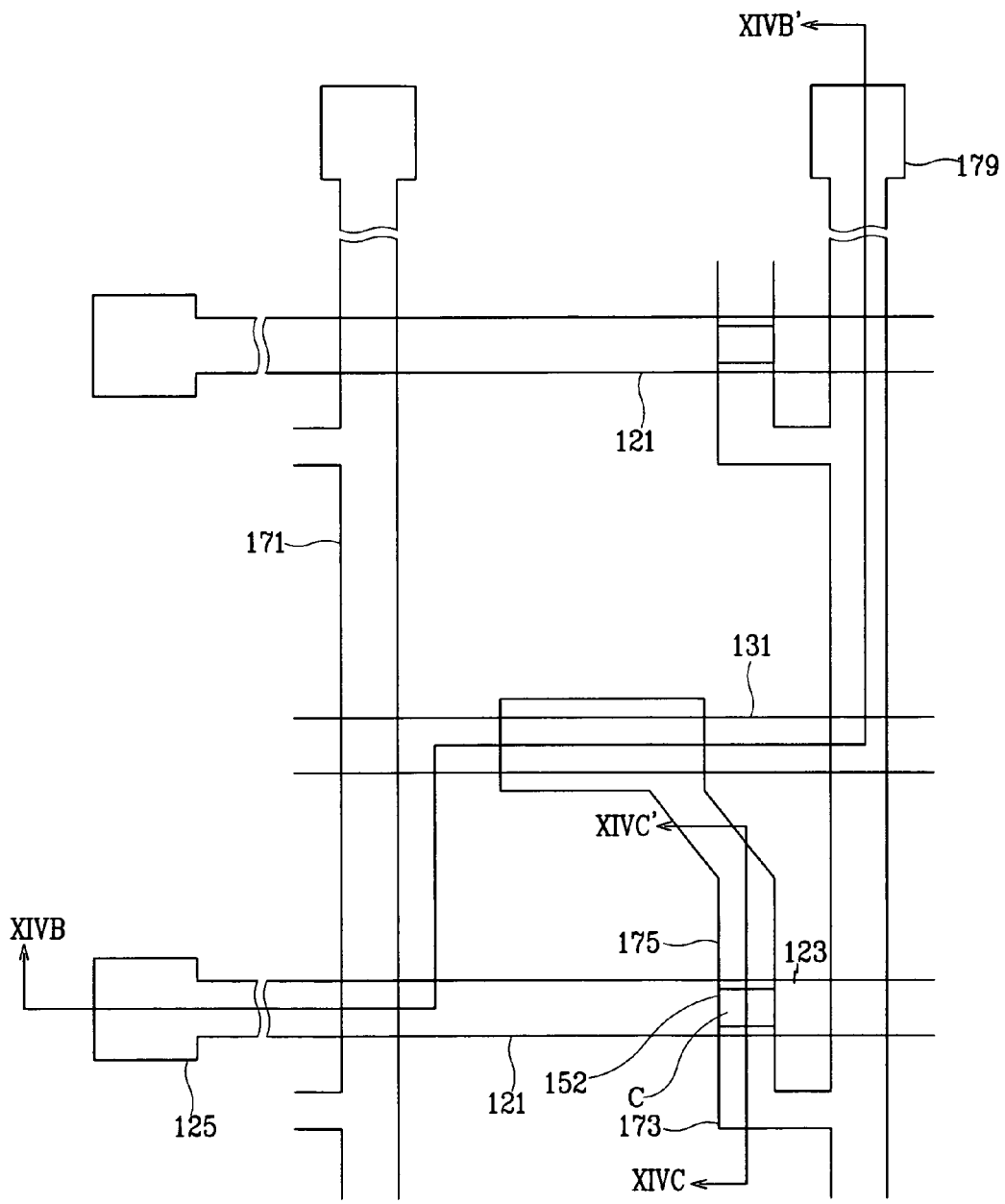
FIG. 14A is a layout view of the TFT array panel in another step of manufacture according to the second embodiment of the invention.
Figure 14B:
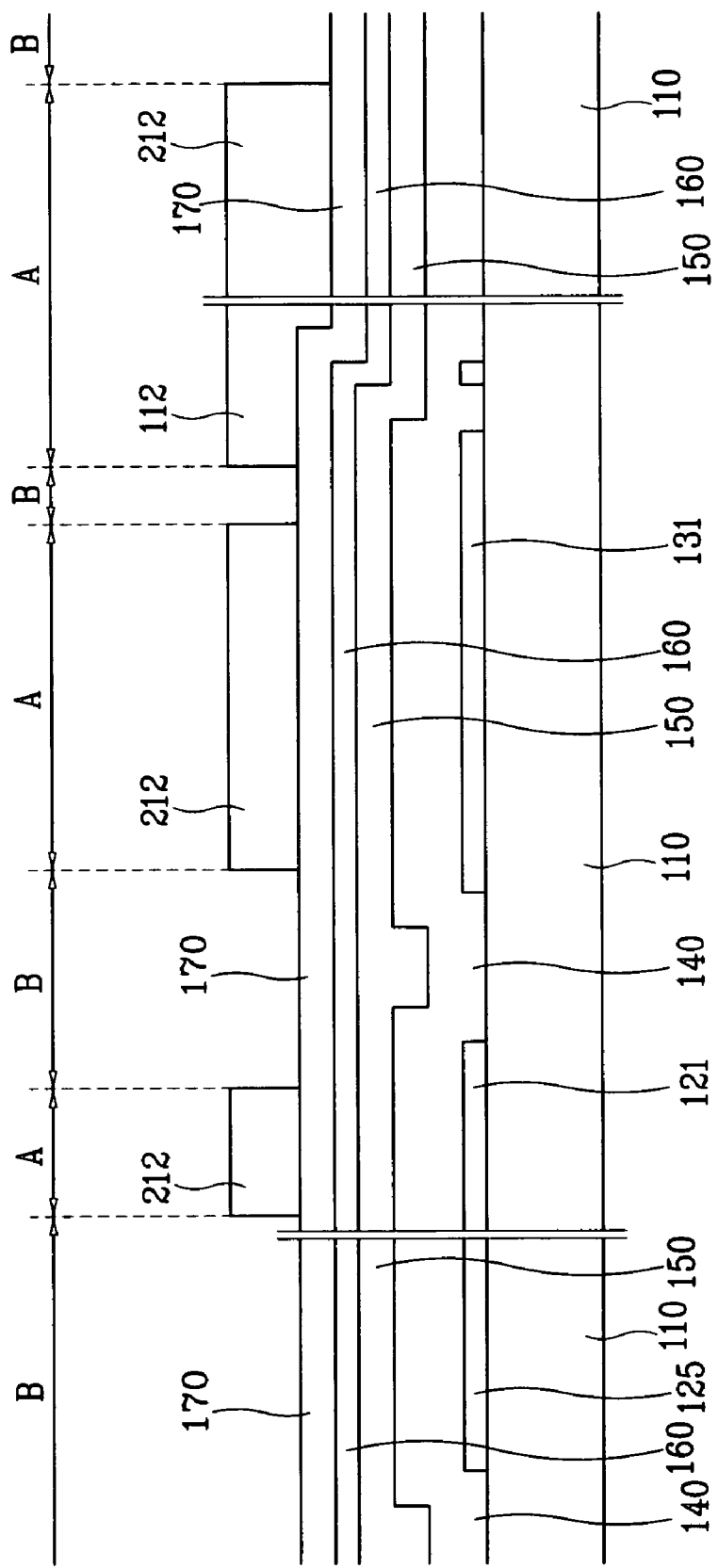

The photoresist film 211 is exposed to light through an exposure mask, and developed to form a photoresist pattern including a plurality of first and second portions 212 and 214 having different thickness as shown in FIGS. 14A-14C. Each of the second portions 214, which is placed on a channel area C of a TFT, has a thickness smaller than the thickness of the first portions 212 placed on data areas A. The portions of the photoresist film 211 on the remaining areas B are removed or have a very small thickness. The thickness ratio of the second portions 214 on the channel areas C to the first portions 212 on the data areas A is adjusted depending upon the etching conditions in the subsequent etching steps. It is preferable that the thickness of the second portions 214 is equal to or less than half of the thickness of the first portions 212, in particular, equal to or less than about 4,000 .ANG..

The position-dependent thickness of the photoresist film is obtained by several techniques, such as, for example, by providing semi-transparent areas on the exposure mask as well as transparent areas and opaque areas. The semi-transparent areas alternatively have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. That is, once a photoresist pattern made of a reflowable material is formed by using a normal exposure mask having only transparent areas and opaque areas, the photoresist pattern is subject to a reflow process to flow onto areas without the photoresist, thereby forming thin portions.

Figure 15A:
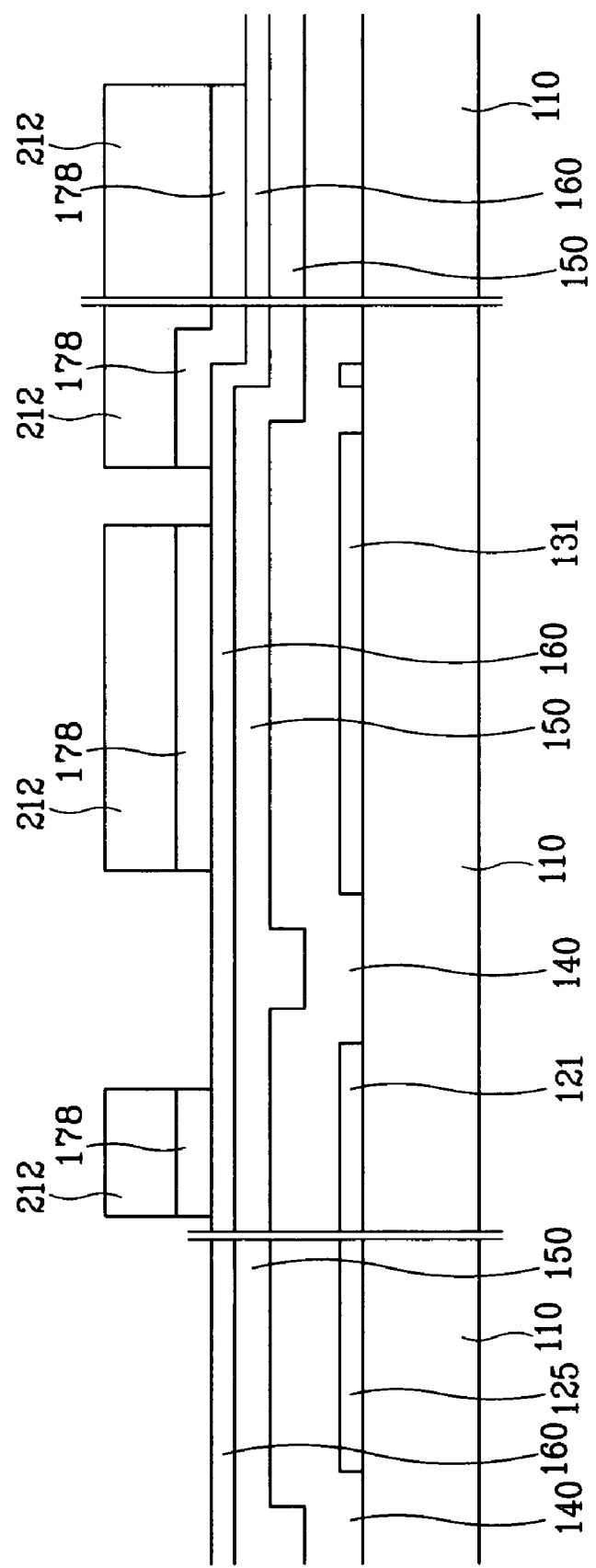
FIGS. 15A, 16A and 17A and FIGS. 15B, 16B and 17B are sectional views taken along the lines XIVB-XIVB' and XIVC-XIVC' in FIG. 14A, respectively, which show another step of manufacture according to the second embodiment of the invention.
Figure 15B:
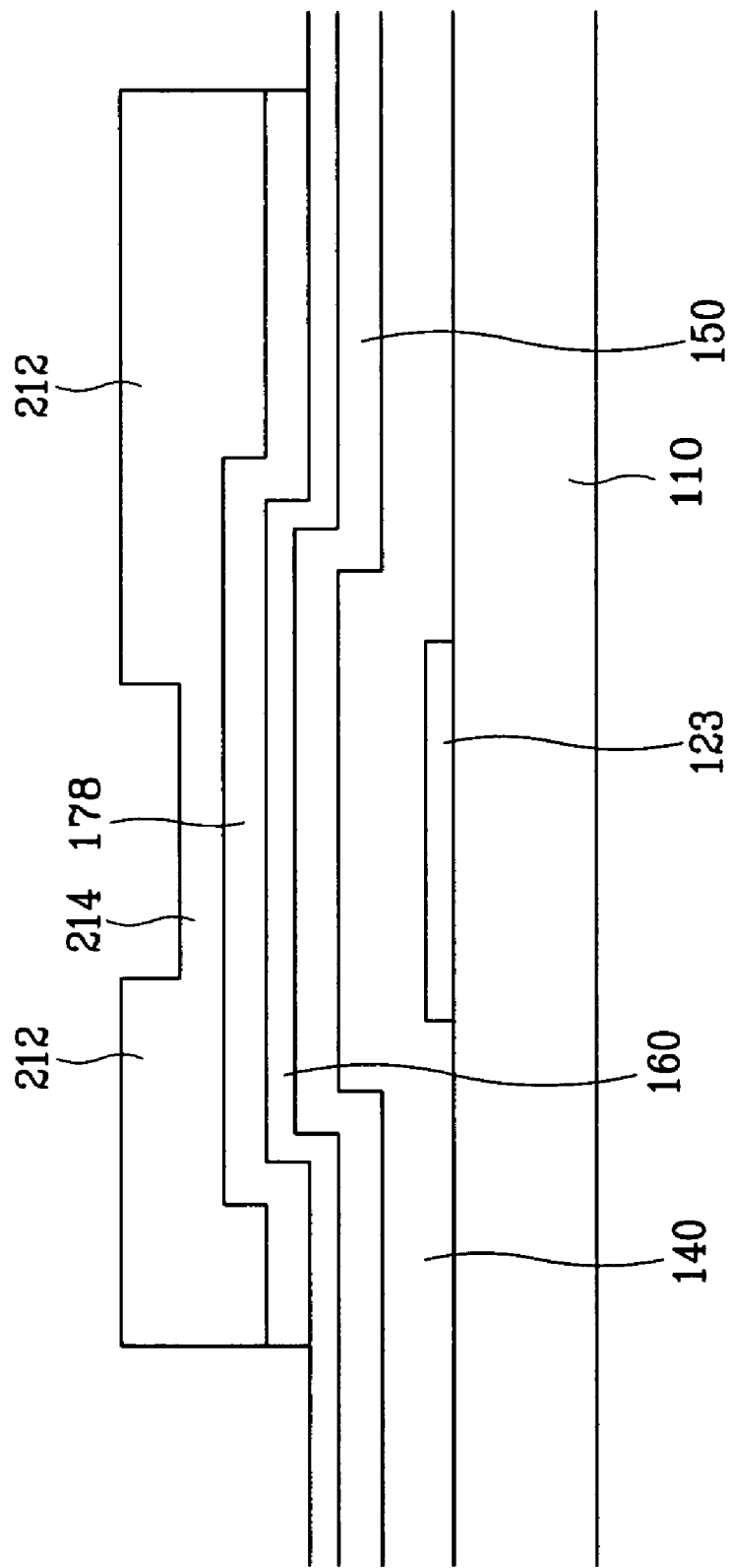
Figure 16A:
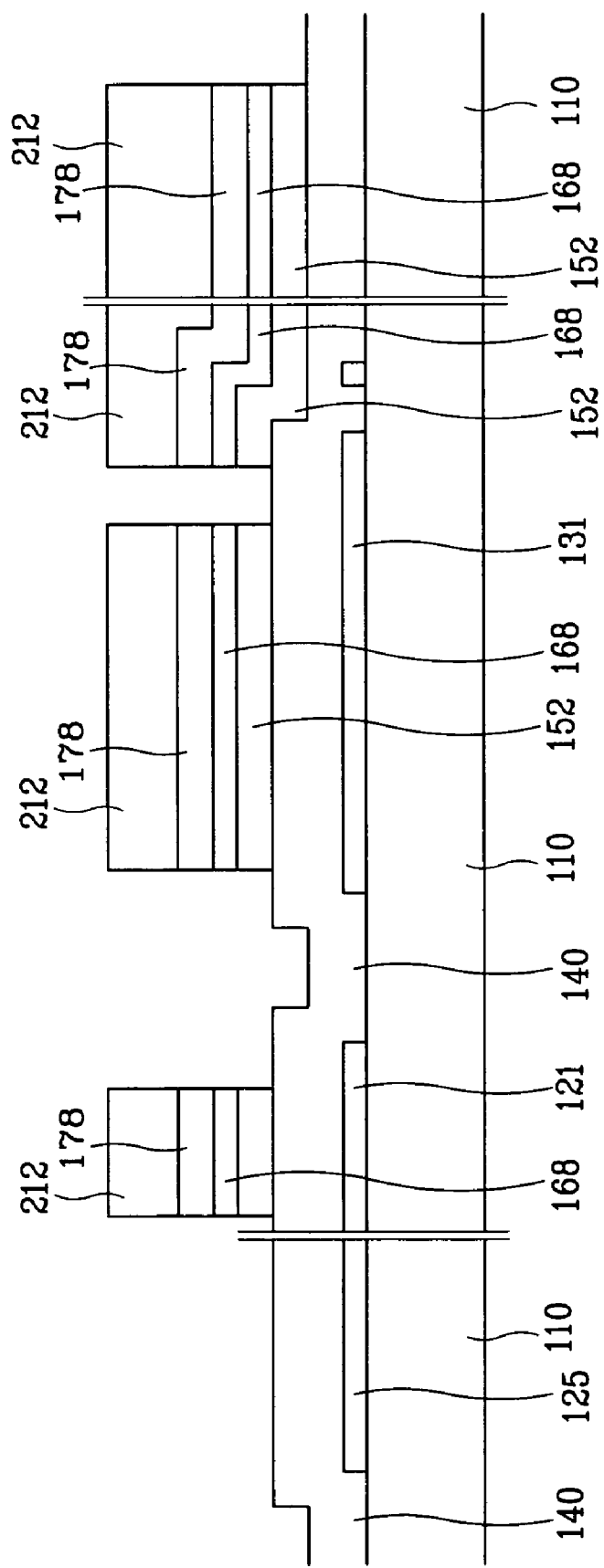
Figure 16B:
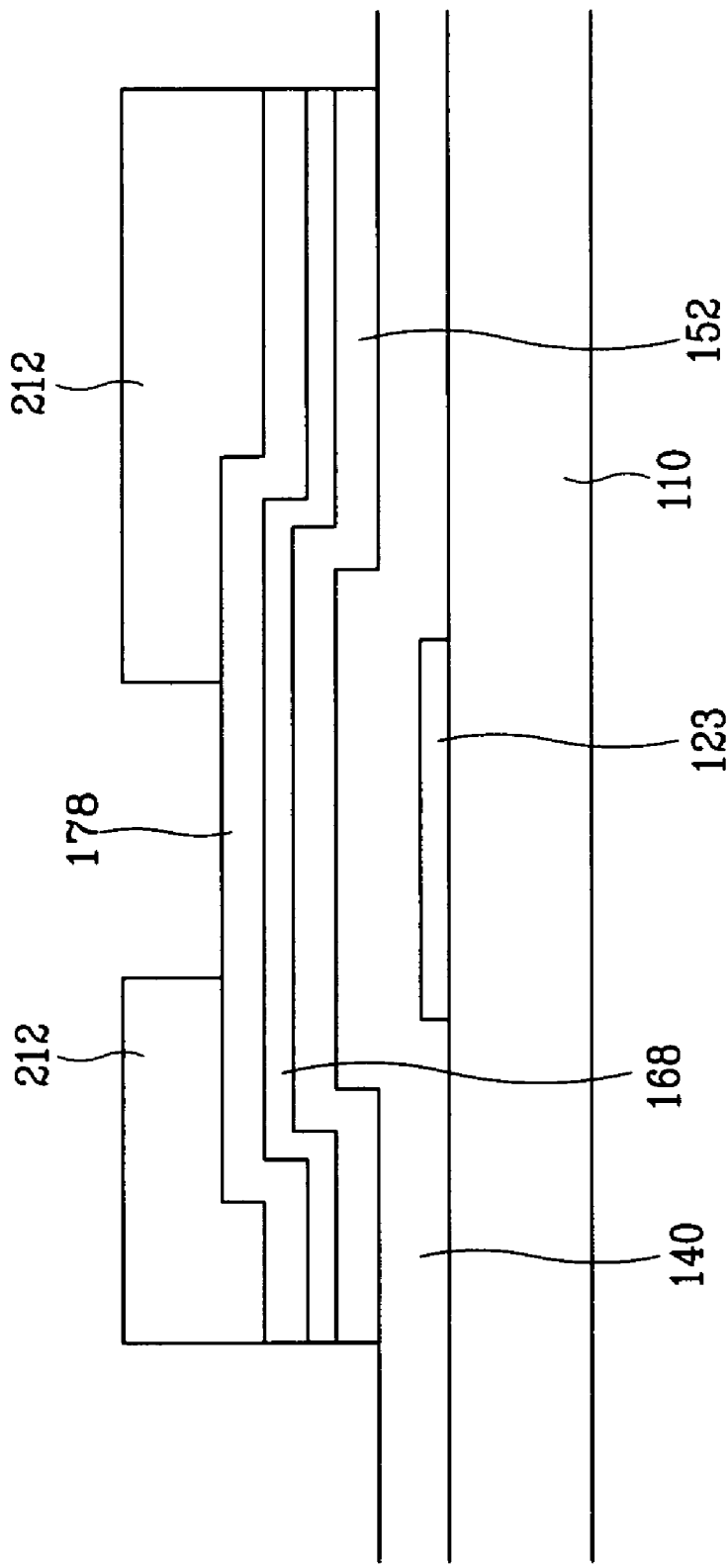

As shown in FIGS. 15A and 15B, the exposed portions of the conductive layer 170 in the areas B are removed to expose the underlying portions of the doped amorphous silicon layer 160. Both dry etch and wet etch are applicable to the conductive layer 170 containing Al or Al alloy. Wet etching, preferably with an etchant CeNHO$_3$, is preferred for Cr. When using dry etch, the two portions 212 and 214 of the photoresist pattern may be etched to have a reduced thickness. Reference numeral 178 indicates the remaining portions of the conductive layer 170, which will be referred to as "conductors." In particular, the reference numeral 178 is referred to as "storage conductors."

Referring to FIGS. 15A and 15B, the exposed portions of the doped amorphous silicon layer 160 in the areas B and the underlying portions of the semiconductor layer 150 are removed preferably by dry etch to expose the underlying conductors 178. The second portions 214 of the photoresist pattern are removed either simultaneously with or independent from the removal of the doped amorphous silicon layer 160 and the semiconductor layer 150. Residue of the second portions 214 remaining on the channel area C is removed by ashing. Reference numeral 152 indicates the remaining portions of the semiconductor layer 150, which will be respectively referred to as "semiconductor stripes" and "semiconductor islands" based on their planar shapes. Reference numeral 168 indicates the remaining portions of the doped amorphous silicon layer 160, which will be respectively referred to as "doped amorphous silicon stripes" and "doped amorphous silicon islands" based on their planar shapes.

Figure 17A:
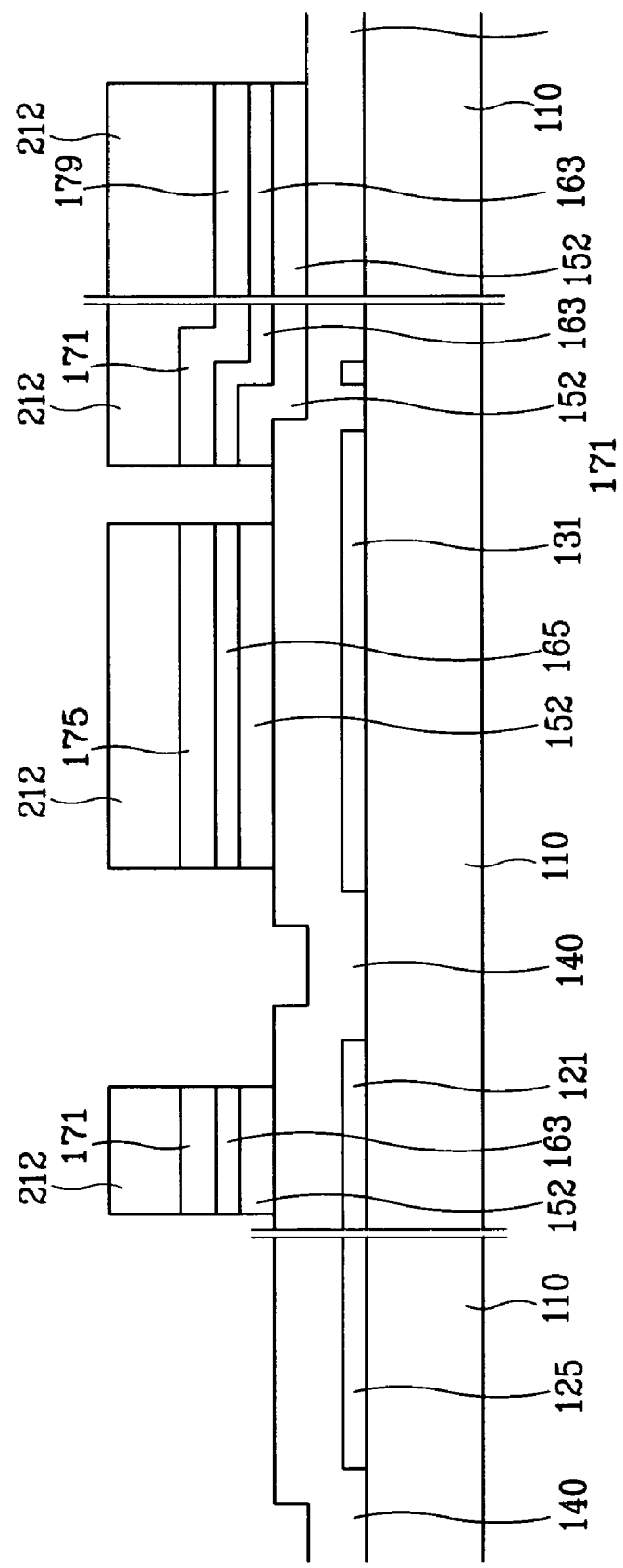
Figure 17B:
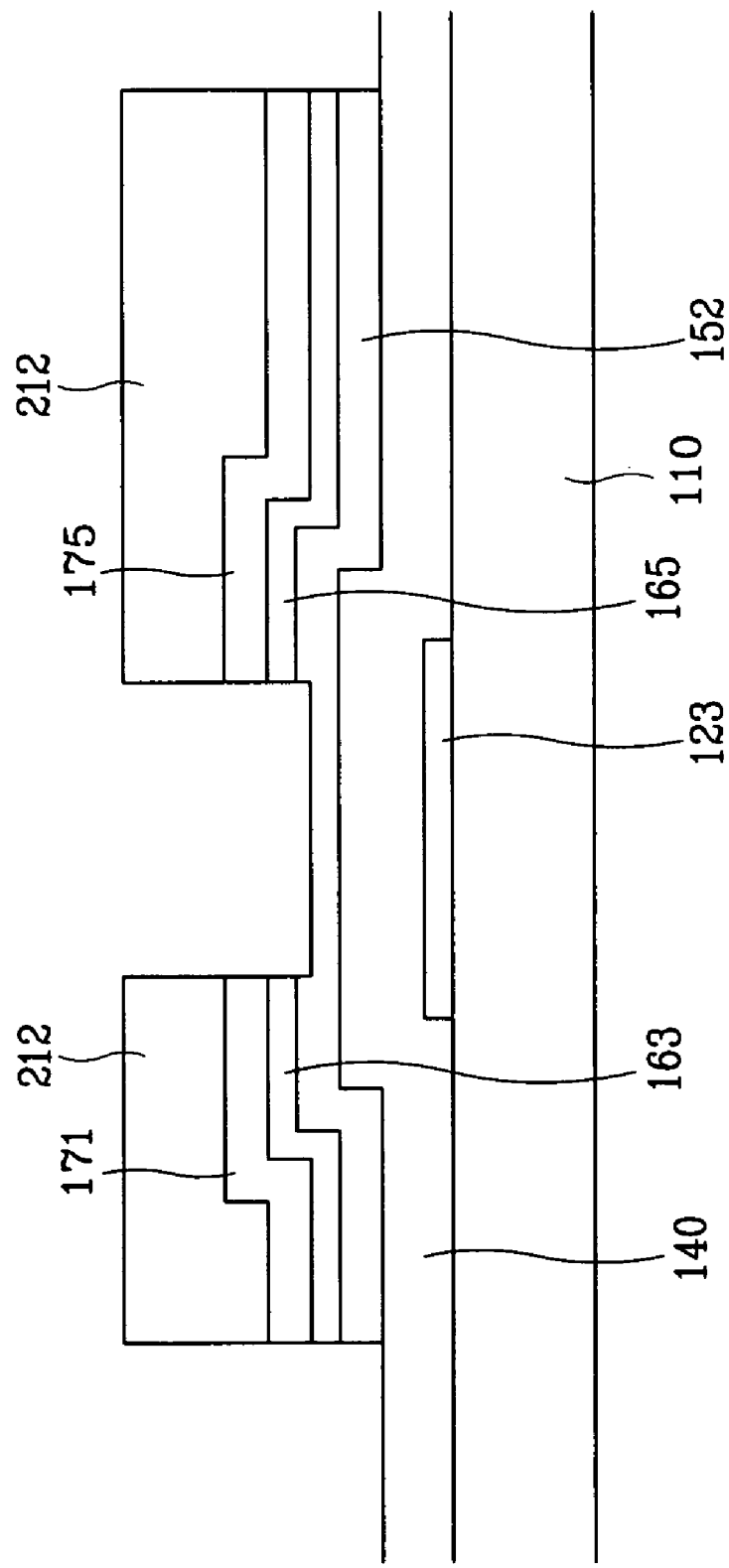

As shown in FIGS. 17A and 17B, the exposed portions of the conductors 178 on the channel areas C and the underlying portions of the doped amorphous silicon stripes 168 are removed. As shown in FIG. 17B, top portions of the semiconductor stripes 152 on the channel areas C may be removed to cause thickness reduction, and the first portion 212 of the photoresist pattern is etched to a predetermined thickness.

In this way, each conductor 178 on the channel area is divided into a data line 171 and a plurality of drain electrodes 175 to be completed, and also each doped amorphous silicon stripe 168 is divided into an ohmic contact stripe 163 and a plurality of ohmic contact islands 165 to be completed.

The first portions 212 remaining on the data areas A are removed either after the removal of the portions of the conductors 178 on the channel areas C or after the removal of the underlying portions of the doped amorphous silicon stripes 168.

Figure 18A:
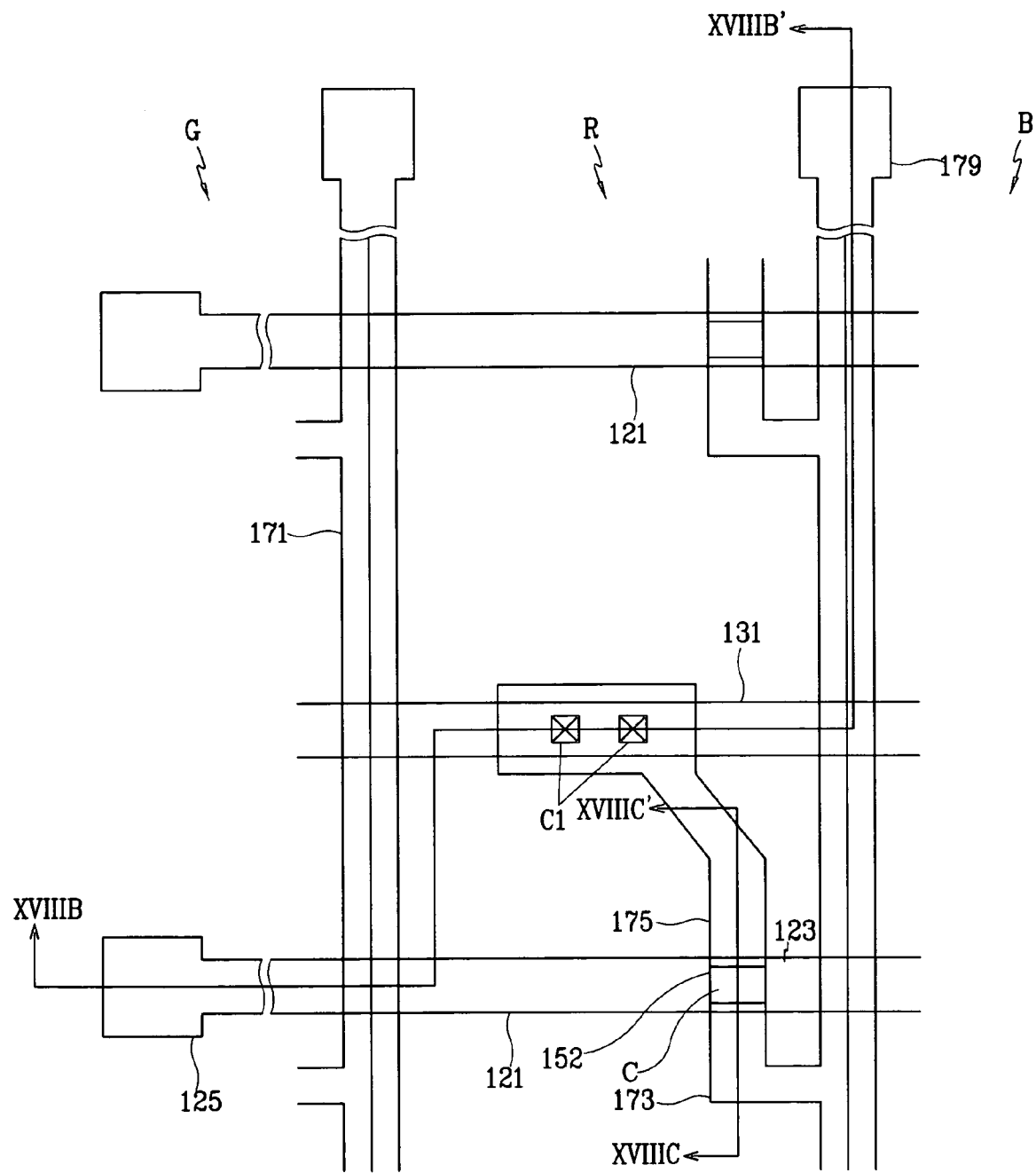
FIG. 18A is a layout view of the TFT array panel in another step of manufacture according to the second embodiment of the invention.
Figure 18B:
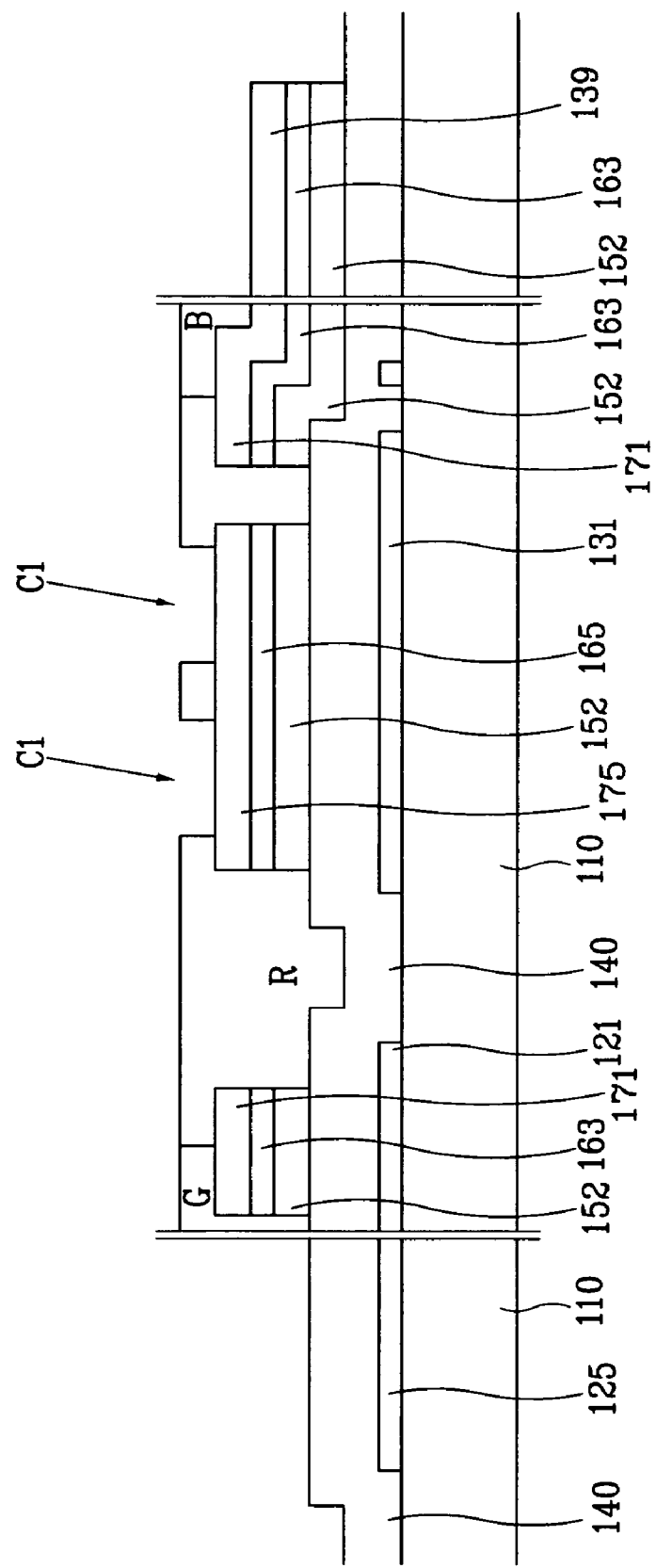
FIGS. 18B and 18C are sectional views of the TFT array panel shown in FIG. 18A taken along the lines XVIIIB-XVIIIB' and XVIIIC-XVIIIC', respectively.
Figure 18C:
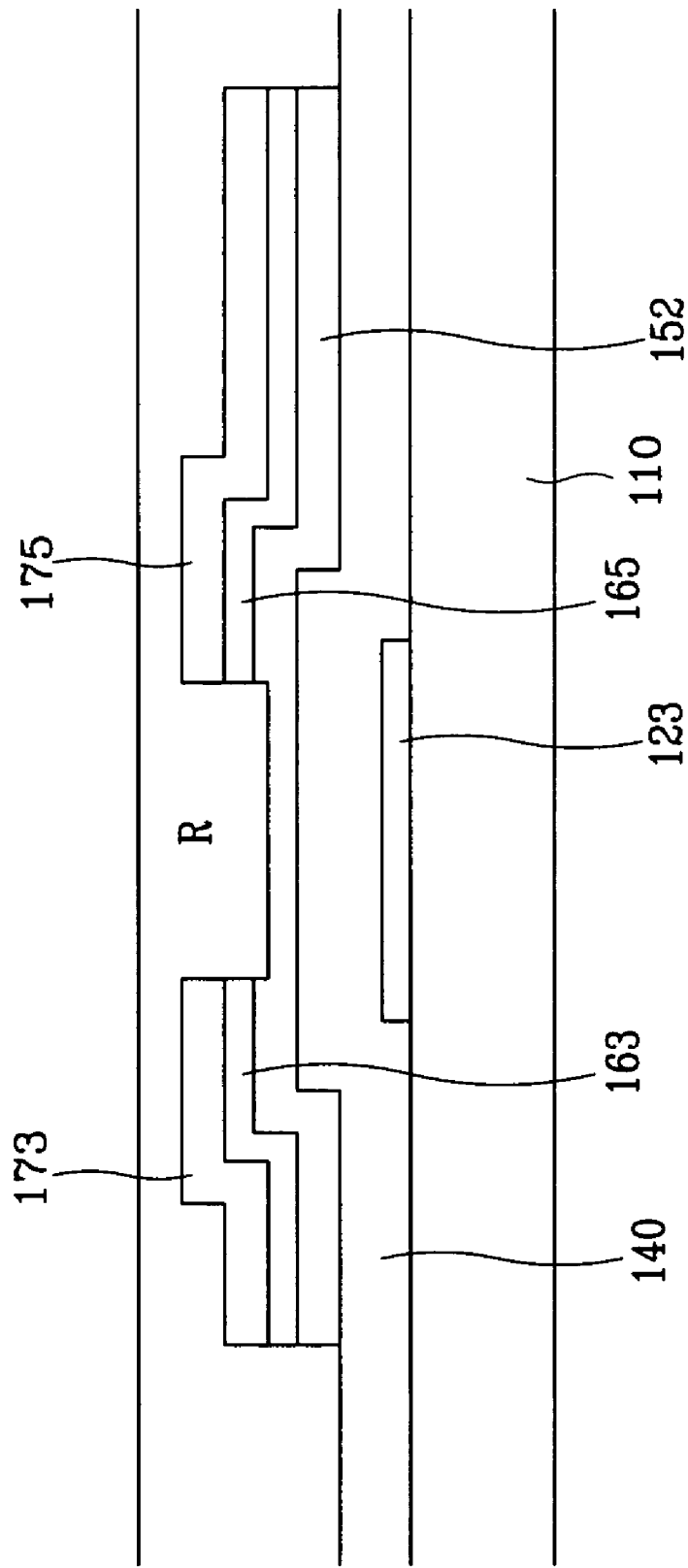
Figure 19A:
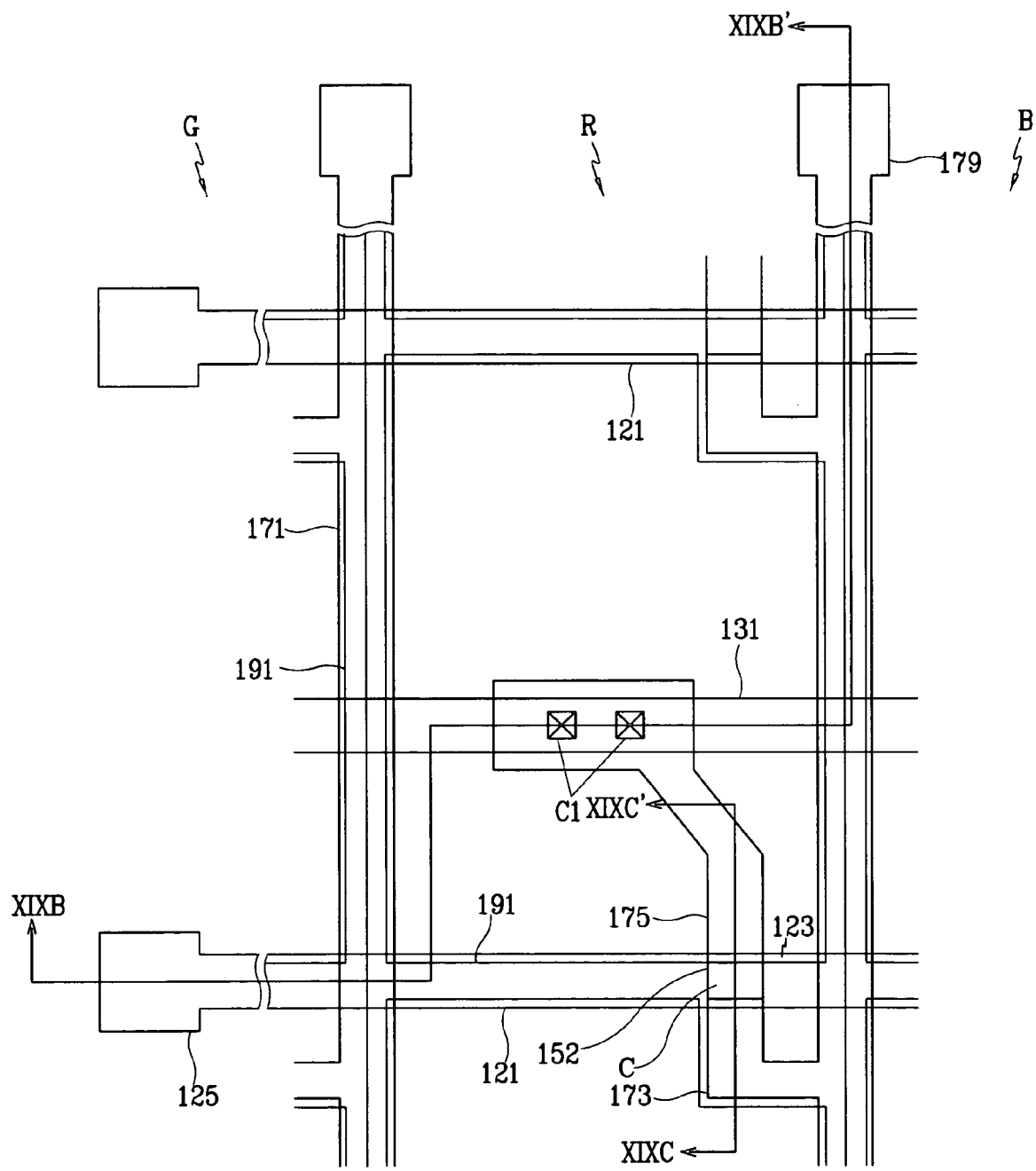
FIG. 19A is a layout view of the TFT array panel in another step of manufacture according to the second embodiment of the invention.
Figure 19B:
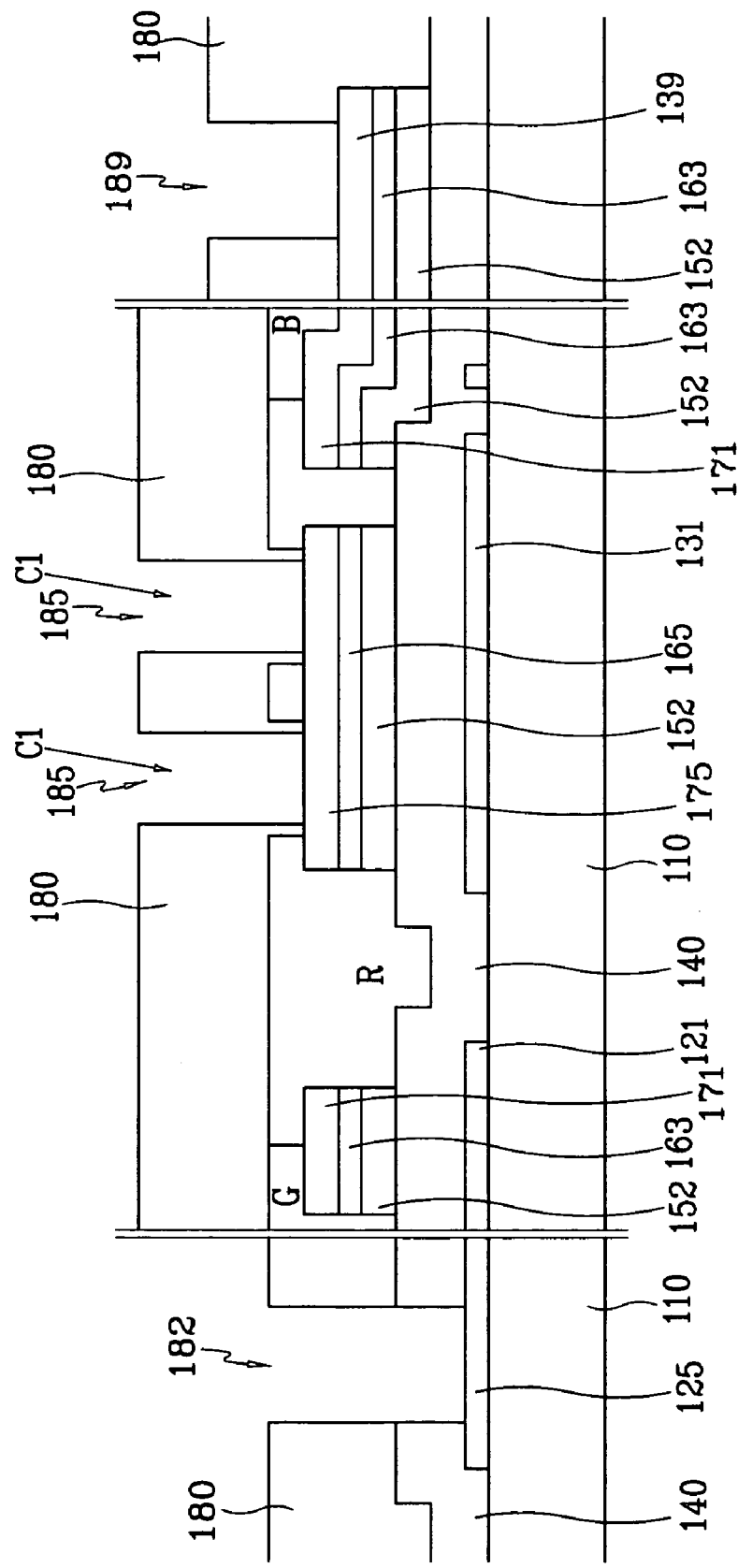
FIGS. 19B and 19C are sectional views taken along the lines XIXB-XIXB' and XIXC-XIXC' in FIG. 19A.
Figure 19C:
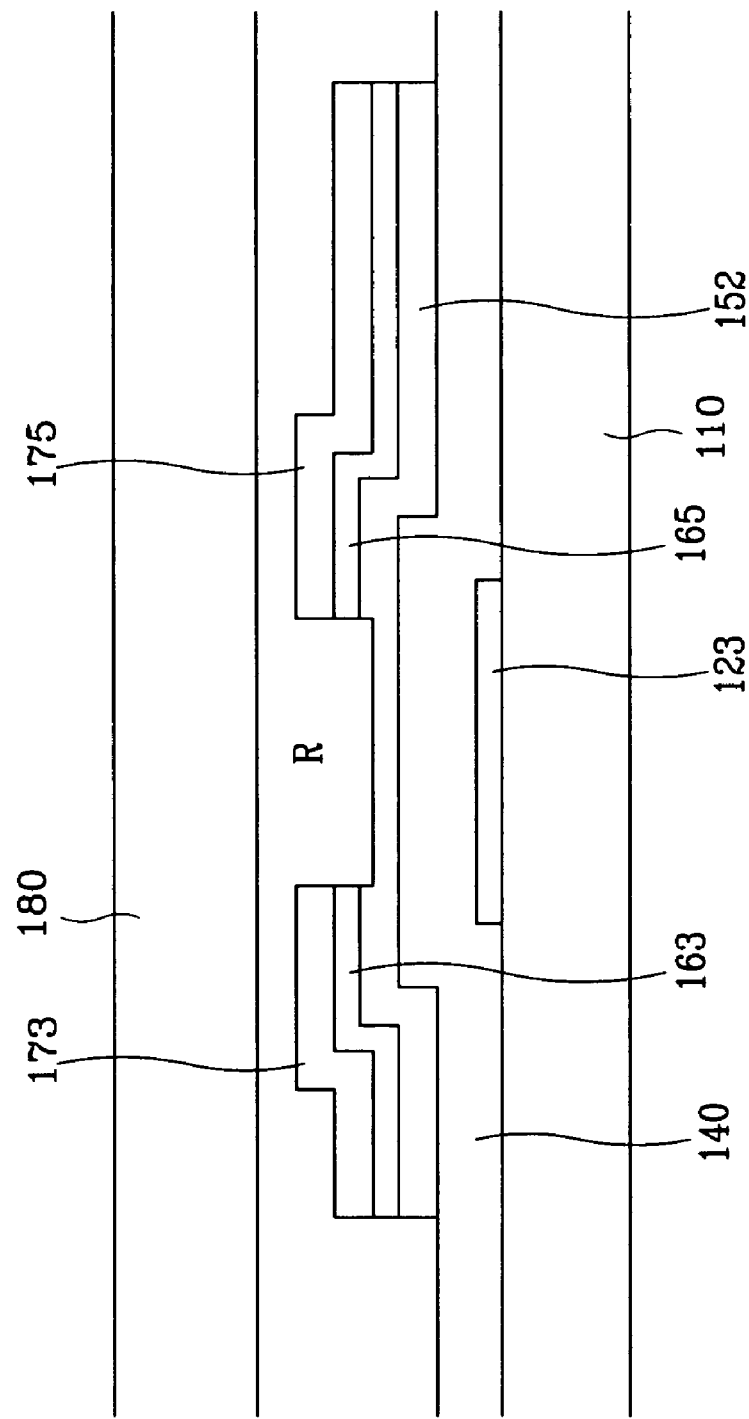

After the data lines 171 and the drain electrodes 175 are formed, photoresist layers respectively including red, green and blue pigments are coated, and patterned by photolithography with exposure and development to form the color filters R, G and B in sequence, as shown in FIGS. 18A to 18C.

A light blocking film made of red or green color filter may be formed on the channel portions C of the TFT. The light blocking film helps block or absorb visible rays having short wavelengths incident on the channel portions C of the TFTs.

A passivation layer 180 is formed on the color filters R, G and B by chemical vapor deposition. The passivation layer 180 is patterned together with the gate insulating layer 140 by a photo etching process using a mask to form a plurality of contact holes 187, 182, 189 and 185 that expose the drain electrodes 175, the end portions 125 of the gate lines 121, the end portions 179 of the data lines 171 and the storage-capacitor conductors 177, respectively.

As shown in FIGS. 9 to 11, a plurality of pixel electrodes 191 and a plurality of contact assistants 192 and 199 having a thickness of about 400-500 Å are formed, and then a lower alignment layer 13 is formed.

The second embodiment simultaneously forms the data lines 171, the drain electrodes 175, the storage capacitor conductors, and underlying ohmic contact patterns 163 and 165 and semiconductor pattern 152 as well as separates the source electrodes 173 and the drain electrodes 175, thereby simplifying the manufacturing process.

Although the TFT array panels of the first and the second embodiments have red, green and blue color filters, in other embodiments the color filters may be provided on the opposite panel. In addition, in other embodiments of the invention, the protrusions included in the TFT array panels of the first and the second embodiments may be omitted for other mode LCDs such as TN mode LCDs.

Figure 20:
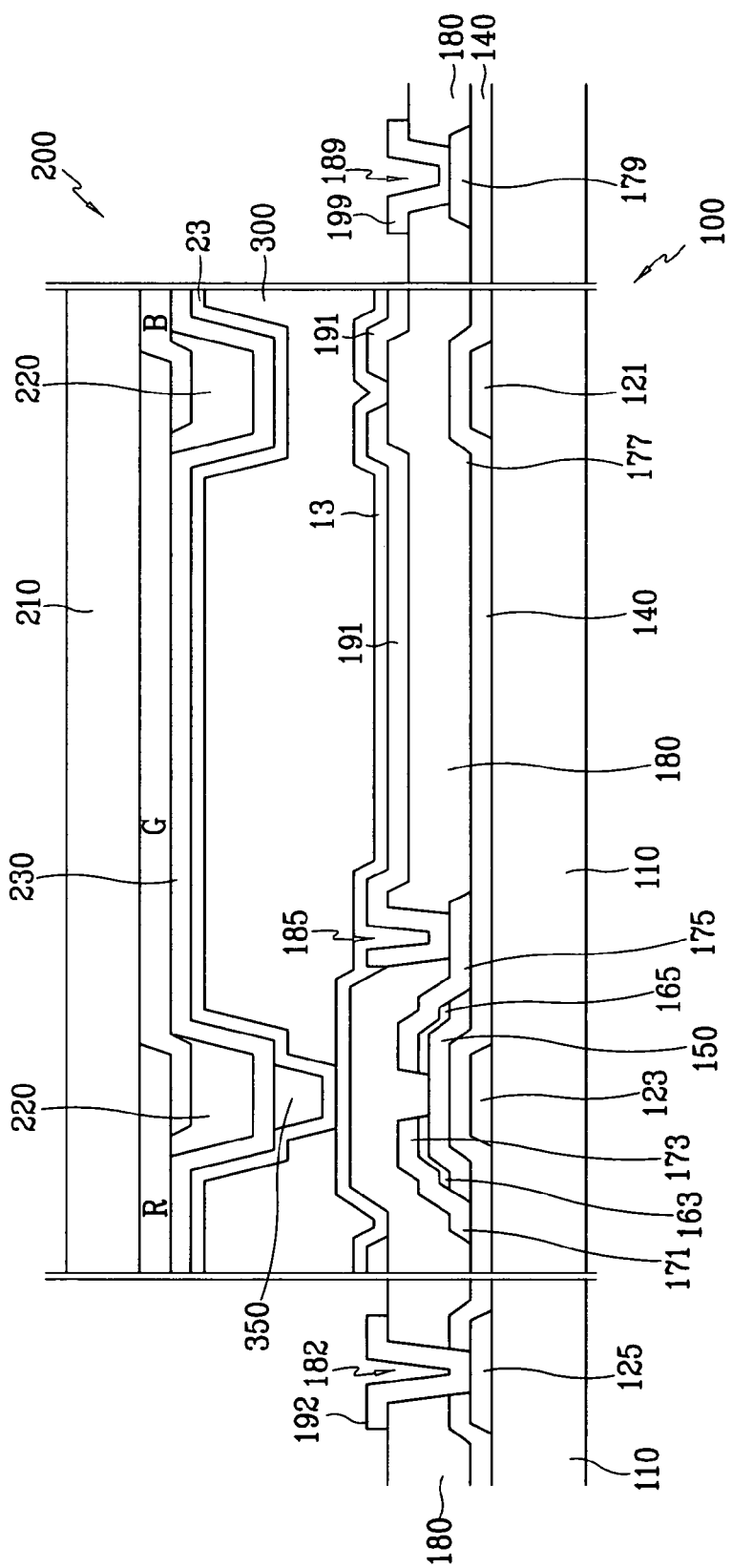
FIG. 20 is a layout view of a TFT array panel for an LCD according to a third embodiment of the present invention.

FIG. 20 is a sectional view of an LCD according to a third embodiment of the present invention.

Referring to FIG. 20, an LCD according to a third embodiment of the present invention has a structure similar to that shown in FIG. 2.

Unlike the LCD shown in FIG. 2, the LCD according to the third embodiment of the invention includes red, green and blue color filters R, G and B on an upper panel 200 and no protrusion on the pixel areas.

The TFT array panel, the method for manufacturing the panel and the LCD according to embodiments of the present invention may have various modifications and may be manufactured by various modified methods.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of forming a display device, comprising:
   forming a first panel, the step of forming the first panel comprising:
      forming a black matrix over portions of a first substrate;
      forming a common electrode in contact with the black matrix;
      forming a spacer in contact with the common electrode, the spacer disposed over the black matrix; and
      forming a protrusion in contact with the common electrode, the protrusion not disposed over the black matrix;
   forming a second panel, the step of forming the second panel comprising:
      forming a pixel electrode over a second substrate;
      forming a gate line over the second substrate;
      forming a gate insulating layer over the gate line;
      forming a semiconductor pattern over the gate insulating layer;
      forming an ohmic contact pattern over the semiconductor pattern; and
      forming a data line over the ohmic contact pattern, the data line intersecting the gate line and including a source electrode, a drain electrode and a storage-capacitor conductor;
   forming a color filter over the data line, the color filter comprising a first contact hole that exposes the drain electrode and a second contact hole that exposes the storage-capacitor conductor; and
   disposing the first panel and the second panel over one another such that the pixel electrode faces the common electrode and black matrix with a liquid crystal layer therebetween, a vertical distance between the first panel and the second panel being determined by thicknesses of the spacer and the black matrix,
   wherein the protrusion and the spacer are formed with substantially the same thickness, with the spacer being thicker than the protrusion, wherein the thickness corresponds to a direction perpendicular to the first panel, wherein the spacer is formed on a higher portion than a position of the protrusion in the direction perpendicular to the first panel, and wherein the protrusion and the spacer are not attached to each other.

2. The method of claim 1, wherein the protrusion and the spacer are formed simultaneously.

3. The method of claim 1, further comprising:
   forming a passivation layer over the color filter; and
   forming contact holes in the passivation layer that coincide with the first and second contact holes of the color filter, wherein the passivation layer covers the color filter.

4. The method of claim 3, wherein the contact holes in the passivation layer are larger than the first and second contact holes of the color filter.

5. The method of claim 1, wherein the semiconductor pattern, the ohmic contact pattern and the data line are formed simultaneously in steps comprising:
   forming a semiconductor layer over the gate insulation layer;
   forming a doped amorphous silicon layer over the semiconductor layer;
   forming a conductive layer over the doped amorphous silicon layer; and
   removing a portion of the conductive layer, a portion of the doped amorphous silicon layer and a portion of the semiconductor layer in a channel region to separate the conductive layer into a data line and a drain electrode, to separate the doped amorphous silicon layer into an ohmic contact pattern and to form a semiconductor pattern.

6. The method of claim 5, wherein the step of removing comprises:
forming a photoresist film over the conductive layer, the photoresist film having a thin portion in the channel region;
removing the thin portion of the photoresist layer to expose the portion of the conductive layer in the channel region; and
etching the portion of the conductive layer, the portion of the doped amorphous silicon layer and the portion of the semiconductor layer.

7. The method of claim 5, wherein the portion of the semiconductor layer is partially removed to form the semiconductor pattern.

8. A method of forming a display device, comprising:
forming a first panel, the step of forming the first panel comprising:
    forming a black matrix over portions of a first substrate;
    forming a common electrode in contact with the black matrix;
    forming a spacer over the common electrode and the black matrix; and
    forming a protrusion in contact with the common electrode, the protrusion not disposed over the black matrix;
forming a second panel, the step of forming the second panel comprising:
    forming a gate line over a second substrate;
    forming a gate insulating layer over the gate line;
    forming a semiconductor pattern, an ohmic contact pattern and a data line simultaneously over the gate line;
    forming a pixel electrode over the semiconductor pattern, the ohmic contact pattern and the data line; and
    forming a color filter over the data line, the color filter comprising a first contact hole that exposes a drain electrode and a second contact hole that exposes a storage-capacitor conductor; and
disposing the first panel and the second panel over one another such that the pixel electrode faces the common electrode with a liquid crystal layer therebetween,
wherein the protrusion and the spacer are formed with substantially the same thickness, with the spacer being thicker than the protrusion, wherein the thickness corresponds to a direction perpendicular to the first panel, wherein the spacer is formed on a higher portion than a position of the protrusion in the direction perpendicular to the first panel, and wherein the protrusion and the spacer are not attached to each other.

9. The method of claim 8, wherein the semiconductor pattern, the ohmic contact pattern and the data line are formed simultaneously in steps comprising:
forming a semiconductor layer over the gate insulation layer;
forming a doped amorphous silicon layer over the semiconductor layer;
forming a conductive layer over the doped amorphous silicon layer; and
removing a portion of the conductive layer, a portion of the doped amorphous silicon layer and a portion of the semiconductor layer in a channel region to separate the conductive layer into a data line and a drain electrode, to separate the doped amorphous silicon layer into an ohmic contact pattern and to form a semiconductor pattern.

10. The method of claim 9, wherein the step of removing comprises:
forming a photoresist film over the conductive layer, the photoresist film having a thin portion in the channel region;
removing the thin portion of the photoresist layer to expose the portion of the conductive layer in the channel region; and
etching the portion of the conductive layer, the portion of the doped amorphous silicon layer and the portion of the semiconductor layer.

11. The method of claim 8, wherein the protrusion provides divisional alignment of liquid crystal molecules in the liquid crystal layer.

12. The method of claim 11, wherein the spacer and the protrusion are formed simultaneously.

13. The method of claim 8, further comprising:
forming a passivation layer over the color filter; and
forming contact holes in the passivation layer that coincide with the first and second contact holes of the color filter, wherein the passivation layer covers the color filter.

14. A display device, comprising:
a first panel, the first panel comprising:
    a black matrix formed over portions of a first substrate;
    a common electrode formed in contact with the black matrix;
    a spacer formed in contact with the common electrode, the spacer disposed over the black matrix; and
    a protrusion formed in contact with the common electrode, the protrusion not disposed over the black matrix;
a second panel, the second panel comprising:
    a pixel electrode formed over a second substrate;
    a gate line formed over the second substrate;
    a gate insulating layer formed over the gate line;
    a semiconductor pattern formed over the gate insulating layer;
    an ohmic contact pattern formed over the semiconductor pattern; and
    a data line formed over the ohmic contact pattern, the data line intersecting the gate line and including a source electrode, a drain electrode and a storage-capacitor conductor;
    a color filter formed over the data line, the color filter comprising a first contact hole that exposes the drain electrode and a second contact hole that exposes the storage-capacitor conductor; and
a liquid crystal layer disposed between the first panel and the second panel such that the pixel electrode faces the common electrode and black matrix with the liquid crystal layer therebetween, a vertical distance between the first panel and the second panel being determined by thicknesses of the spacer and the black matrix,
wherein the protrusion and the spacer are formed with substantially the same thickness, with the spacer being thicker than the protrusion, wherein the thickness corresponds to a direction perpendicular to the first panel, wherein the spacer is formed on a higher portion than a position of the protrusion in the direction perpendicular to the first panel, wherein the protrusion and the spacer are not attached to each other.

15. The display device of claim 14, wherein the protrusion and the spacer are formed of the same material.

16. The display device of claim 14, further comprising: a passivation layer formed over the color filter; and contact holes formed in the passivation layer that coincide with the first and second contact holes of the color filter, wherein the passivation layer covers the color filter.

17. The display device of claim 16, wherein the contact holes in the passivation layer are larger than the first and second contact holes of the color filter.

* * * * *